(12) United States Patent
Liang et al.

(10) Patent No.: US 12,512,118 B2
(45) Date of Patent: Dec. 30, 2025

(54) BEAM SUPPORT FOR STAGGERED MODULES OF A TILTED HEAD IN A STORAGE SYSTEM

(71) Applicant: INTERNATIONAL BUSINESS MACHINES CORPORATION, Armonk, NY (US)

(72) Inventors: Jason Liang, Campbell, CA (US); Cory Yee, San Jose, CA (US); Hoodin Hamidi, San Francisco, CA (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 0 days.

(21) Appl. No.: 18/660,413

(22) Filed: May 10, 2024

(65) Prior Publication Data

US 2025/0349314 A1   Nov. 13, 2025

(51) Int. Cl.
*G11B 15/18* (2006.01)
*G11B 5/00* (2006.01)
*G11B 5/008* (2006.01)
*G11B 5/187* (2006.01)
*G11B 5/39* (2006.01)

(52) U.S. Cl.
CPC .......... *G11B 5/00817* (2013.01); *G11B 5/187* (2013.01); *G11B 5/3967* (2013.01)

(58) Field of Classification Search
CPC ..... G11B 5/1272; G11B 5/02; G11B 5/00821; G11B 5/10; G11B 23/08771; G11B 5/105; G11B 5/3103; G11B 15/1841; G11B 2005/0013
USPC ..................................................... 360/234.7
See application file for complete search history.

(56) References Cited

U.S. PATENT DOCUMENTS

| 5,333,372 A | 8/1994 | Fujioka |
| 6,496,329 B2 | 12/2002 | Hungerford |
| 6,892,445 B2 | 5/2005 | Biskeborn |
| 6,947,247 B2 | 9/2005 | Schwarz |

(Continued)

FOREIGN PATENT DOCUMENTS

| EP | 0162882 A1 | 12/1985 |
| WO | 8502289 | 5/1985 |

OTHER PUBLICATIONS

Liang, et al. "Information Disclosure Statement Transmittal Letter", U.S. Appl. No. 18/660,413, filed May 10, 2024, 2 Pages.

*Primary Examiner* — Nabil Z Hindi
(74) *Attorney, Agent, or Firm* — KONRAD, RAYNES, DAVDA & VICTOR LLP; William K. Konrad

(57) ABSTRACT

In a module of a tape head having multiple modules, a beam support member of at least one module has an alignment leg portion projecting from a body portion of the beam support member at a position displaced from the ends of the beam support member. The alignment leg of one module is matched with the alignment leg of another module to maximize glue adhesion between the legs and minimize positional drifting of the modules after glue curing in a staggered orientation. In another aspect, the support surface of a beam support member of a tape head module extends beyond the end of the wafer chiplet disposed on the beam support member to fully support the wafer chiplet. In still another aspect, one end of a beam support member of a tape head module is chamfered to facilitate mounting the tilted tape head assembly into a tape drive actuator.

20 Claims, 16 Drawing Sheets

(56) References Cited

U.S. PATENT DOCUMENTS

| | | |
|---|---|---|
| 9,230,564 B2 | 1/2016 | Biskeborn |
| 9,324,350 B2 | 4/2016 | Biskeborn |
| 11,817,137 B1 | 11/2023 | Biskeborn |
| 2002/0034042 A1 | 3/2002 | Hungerford et al. |
| 2004/0174628 A1 | 9/2004 | Schwarz et al. |
| 2012/0260496 A1 | 10/2012 | Biskeborn et al. |
| 2015/0206546 A1 | 7/2015 | Biskeborn et al. |
| 2024/0412755 A1* | 12/2024 | Liang .................. G11B 15/1841 |

* cited by examiner

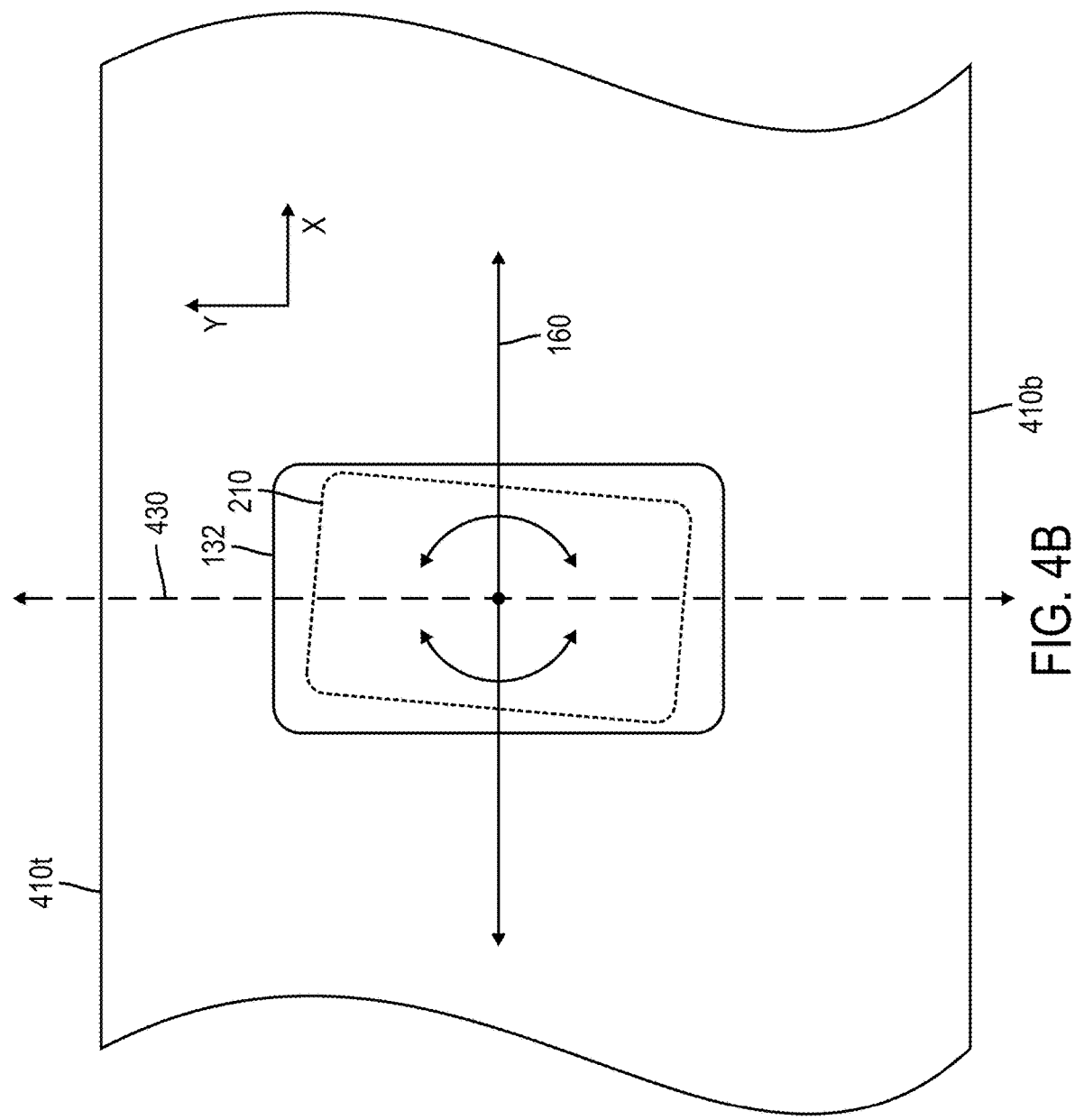

BEAM SUPPORT FOR STAGGERED MODULES OF A TILTED HEAD IN A STORAGE SYSTEM

BACKGROUND OF THE INVENTION

1. Field of the Invention

The present invention relates to magnetoresistive heads for reading from and writing data to storage media in a storage drive.

2. Description of the Related Art

In magnetic storage systems such as tape drives, data is read from and written onto magnetic recording media through data channels utilizing magnetic transducers in a tape head. As used herein the term "magnetic" refers to the various magnetoresistive technologies. Data is written on the magnetic recording media by moving a magnetic recording transducer to a position over the media where the data is to be stored. The magnetic recording transducer then generates a magnetic field, which encodes the data into the magnetic media. Data is read from the media by similarly positioning a magnetic read transducer and then sensing the magnetic field of the magnetic media. Read and write operations may be independently synchronized with the movement of the media to ensure that the data can be read from and written to the desired location on the media. However, during write operations, it is a general practice in tape drives that a read operation is done immediately after the data is written to verify that the data was written properly. This is often referred to as Read-While-Write. In order to achieve this, the reader element is aligned with its associated writer element so that the written track can be verified.

The magnetic transducers for more than one head are typically formed on a single wafer. Arrays of magnetic transducers are typically formed in rows on the wafer which is cut to separate the rows of transducer arrays into wafer chiplets, each having one or more arrays of transducers. A tape head module is formed by bonding a wafer chiplet on a supporting member substrate such as a ceramic U-beam which gives the tape head structural integrity. One known tape head design has three such modules, a left module having an array of writer transducers, a center module having an array of reader transducers, and a right module having another array of writer transducers. These three module are typically bonded together side by side in a tape head assembly.

In addition to reader and writer transducers for reading and writing data, respectively, known tape heads for large scale data storage often include servo transducers to determine the lateral and longitudinal position on the tape for reading and writing. In one known design, servo bands are patterned with data in chevron shapes which are read by the tape head servos to detect the position of the tape head relative to the tape with high accuracy. In this design, when reading from or writing to a data band, a servo of the tape head is positioned in a servo band above the data being read from or written to, and another servo is positioned in an adjacent servo band below the data.

A tape storage media may become deformed due to, for example, changes in tape tension, temperature, humidity, creep and other factors. Such tape deformation, particularly changes in the width of the tape, can cause misregistration between the transducers of the tape head and data tracks previously recorded. In addition, the distance between readers or writer transducers can vary from one tape head to another. Misregistration between the transducers of the tape head and data tracks can cause read errors. The sum of all factors that affect track placement and track following is represented as a track-misregistration budget.

Techniques for compensating for misregistration are often referred to as Track Dimensional Stability (TDS) compensation. One such TDS compensation technique measures tape width with servo patterns and adjusts the tension applied to the tape to change the width of tape. However, this approach is often limited in range and can introduce additional problems such as, for example, longer cycle times due to low tension unload, tape cinch, increased risk of tape breakage, variable tape head friction, variable tape head spacing, etc.

Another technique proposed for TDS compensation is referred to as active skew-based control or compensation. In active skew-based compensation, the tape drive is operated with a head that is tilted so that it has a nominal, non-zero rotation angle (R) relative to the longitudinal direction of tape travel. The effective span of the head can be increased or decreased by decreasing or increasing the absolute value of the rotation angle, respectively. It is believed that such active skew-based control can enable higher track density and hence increased storage capacity.

SUMMARY

A first embodiment provides a computer program product, device, and system employing a tilted tape head in accordance with the present description and a method for assembling a tilted tape head for a storage drive, in accordance with the present description.

In one embodiment, a device for data storage on storage media includes a head having a first support member having a body portion where the body portion has a first end, a second end distal from the first end, a first longitudinal length extending longitudinally from the first end to the second end, and a first width transverse to the longitudinal length. A first wafer chiplet is disposed on the support member and has transducers formed in the chiplet and adapted to at least one of read data from and write data to media moving past the transducers. In one aspect of the present description, the first support member further has a first alignment leg portion projecting from the body portion so that the support member has a width at the first alignment leg portion exceeding the first width of the body portion, and the first alignment leg portion has a bonding surface spaced from both the first and second ends of the body portion of the support member.

In one embodiment, the first support member further has a second alignment leg portion having a bonding surface and projecting from the body portion so that the support member has a width at the second alignment leg portion exceeding the first width of the body portion. In one aspect of the present description, the body portion has a chamfered edge at one end of the body portion.

In one embodiment, the head further has a second support member having a body portion where the body portion of the second support member has a first end, a second end distal from the first end, a first length extending longitudinally from the first end to the second end, and a first width transverse to the longitudinal length. A second wafer chiplet is disposed on the second support member and has head transducers formed in the second wafer chiplet and adapted to at least one of read data from and write data to media moving past the transducer. The second support member further has a first alignment leg portion projecting from the body portion of the second support member and having a bonding surface aligned and bonded with the bonding surface of an alignment leg portion of the first support member. The second support member further has a second alignment leg portion projecting from the body portion of the second support member and has a bonding surface aligned and bonded with a bonding surface of another alignment leg portion of the first support member.

In one embodiment, the head further has a third support member having a body portion where the body portion of the third support member has a first end, a second end distal from the first end, a first length extending longitudinally from the first end to the second end, and a first width transverse to the longitudinal length. A third wafer chiplet is disposed on the third support member and has transducers formed in the third wafer chiplet and adapted to at least one of read data from and write data to media moving past the transducer. In another aspect of the present description, the third support member further has a first alignment leg portion spaced from both the first and second ends and projecting from the body portion of the third support member. The first alignment leg portion of the third support member has a bonding surface bonded to the second support member and aligned with an alignment leg portion of the second support member and also aligned with an alignment leg portion of the first support member. In one embodiment, the third support member further has a second alignment leg portion projecting from the body portion of the third support member and has a bonding surface bonded to the second support member and aligned with an alignment leg portion of the second support member and also aligned with an alignment leg portion of the first support member.

In another aspect of the present description, the first, second and third support members are positioned within the head in a tilted position defining a tilt direction relative to a longitudinal direction of media motion past the head, and in a staggered arrangement so that one end of the first support member is displaced relative to an adjacent end of the second support member in the tilt direction, one end of the second support member is displaced relative to an adjacent end of the third support member in the tilt direction, and one end of the third support member is displace relative to adjacent ends of the first and second support members in the tilt direction.

In yet another aspect of the present description, the first, second and third support members each have a chiplet support surface having a boundary, and the first, second and third wafer chiplets each define a wafer chiplet footprint positioned wholly within the chiplet support surface boundary of the chiplet support surface of the associated support member so that the first wafer chiplet is fully supported over its entire footprint by the chiplet support surface of the first support member, and the third wafer chiplet is fully supported over its entire footprint by the chiplet support surface of the third support member.

In yet another aspect of the present description, a tilted head in accordance with the present description, is mounted in a tape drive for data storage in data tracks on magnetic tape, where the tape drive includes a tape actuator configured to move the magnetic tape in a linear direction past the tape head, a pivotal actuator configured to cause pivotal motion of the tape head to skew the tape head relative to data tracks of the magnetic tape, and a controller configured to control the actuators and transducers to at least one of read data from and write data to data tracks of magnetic tape moving past the transducers.

In another aspect of the present description, a method of fabricating a tape head for a tape drive for data storage on magnetic tape, includes securing a first wafer chiplet having a first chiplet footprint onto a first chiplet support surface of a first body portion of a first support member having a first end, and a second end distal from the first end. In one aspect of the present disclosure, the first chiplet support surface has a length longer than the first wafer chiplet footprint and a width wider than the first wafer chiplet footprint so that first wafer chiplet is fully supported over its entire footprint by the first chiplet support surface of the first support member. In one embodiment, the first wafer chiplet has transducers formed in the chiplet and adapted to at least one of read data from and write data to media moving past the transducers.

In one embodiment, the first support member further has a first alignment leg portion projecting from the first body portion so that the first support member has a width at the first alignment leg portion exceeding the width of the first body portion, and the first alignment leg portion has a bonding surface spaced from both the first and second ends of the support member, and the method further includes securing a second wafer chiplet having a second chiplet footprint onto a second chiplet support surface of a second body portion of a second support member where the second wafer chiplet has transducers formed in the second chiplet and adapted to at least one of read data from and write data to media moving past the transducers of the second chiplet. In one aspect of the present disclosure, the method further includes aligning and bonding a bonding surface of a first alignment leg portion projecting from the second body portion of the second support member, with the bonding surface of the first alignment leg portion of the first support member.

In still another aspect of the present description, the method further includes aligning and bonding a bonding surface of a second alignment leg portion projecting from the second body portion of the second support member, with a bonding surface of a second alignment leg portion projecting from the first body portion of the first support member. In one embodiment, the method further includes securing a third wafer chiplet having a third chiplet footprint onto a third chiplet support surface of a third body portion of a third support member having a first end, and a second end distal from the first end of the third support member. In one aspect of the present disclosure, the third chiplet support surface of the third support member has a length longer than the third wafer chiplet footprint and a width wider than the third wafer chiplet footprint so that third wafer chiplet is fully supported over its entire footprint by the third chiplet support surface of the third support member. In one embodiment, the third wafer chiplet has transducers formed in the chiplet and adapted to at least one of read data from and write data to media moving past the transducers of the third chiplet.

In one embodiment, the third support member further has a first alignment leg portion projecting from the third portion of the third support member so that the third support member has a width at the first alignment leg portion exceeding the width of the third body portion, the first alignment leg portion of the third support member having a bonding surface spaced from both the first and second ends of the third support member. In one aspect of the present disclosure, the method further includes aligning the first alignment leg portion projecting from the third body portion of the third support member, with the first alignment leg portions of the first and second support members, and bonding the bonding surface of the first alignment leg portion of the third support member with a bonding surface of the second support member.

In one embodiment, the method further includes aligning a second alignment leg portion projecting from the third body portion of the third support member, with the second alignment leg portions of the first and second support members, and bonding a bonding surface of the second alignment leg portion of the third support member with a bonding surface of the second support member.

In one aspect of the present disclosure, the method further includes positioning the first, second and third support members within the head in a tilted position defining a tilt direction relative to a longitudinal direction of media motion past the tape head, and in a staggered arrangement so that one end of the first support member is displaced relative to an adjacent end of the second support member in the tilt direction, one end of the second support member is displaced relative to an adjacent end of the third support member in the tilt direction, and one end of the third support member is displaced relative to adjacent ends of the first and second support members in the tilt direction.

BRIEF DESCRIPTION OF THE DRAWINGS

FIG. 4B is another top schematic view of the tape head assembly of FIG. 2, mounted in a tape drive actuator, in accordance with one embodiment of the present disclosure.

DETAILED DESCRIPTION

Figure 1:
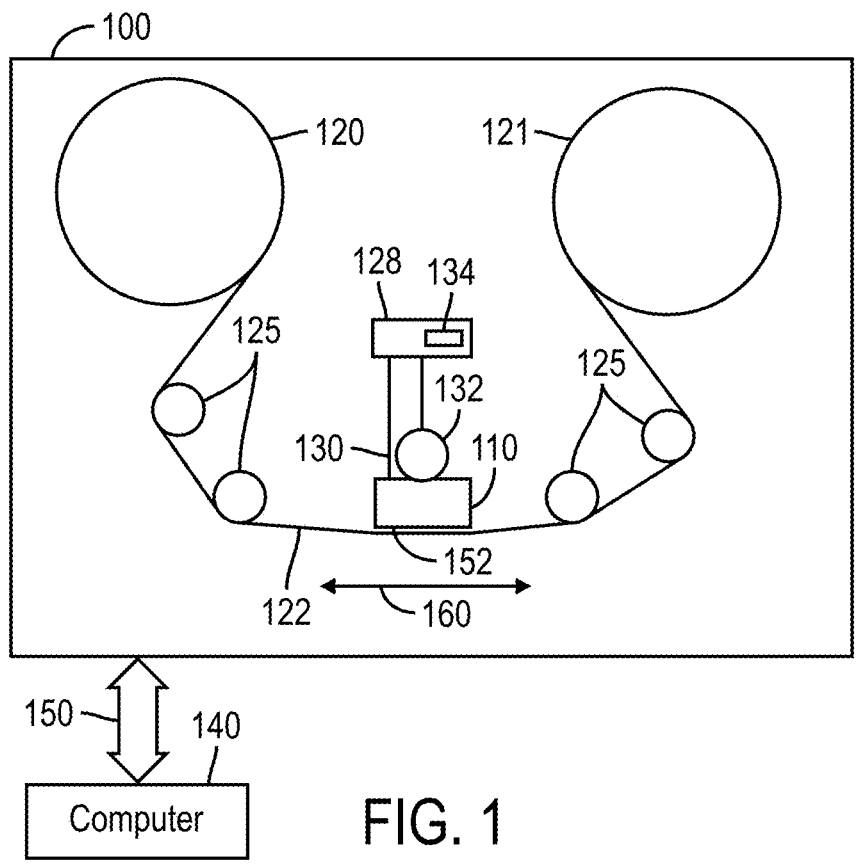
FIG. 1 is a schematic diagram of a storage system employing a tilted tape head in accordance with one embodiment of the present disclosure.

Described embodiments provide improvements to computer technology for storing and retrieving data in storage systems such as tape drives, for example, having a tape head which reads data from or writes data to a magnetic tape media. In one embodiment, a tilted tape head has beam support members which facilitate maintaining alignment of modules of the tape head which have been bonded together in a staggered arrangement. For example, in a head assembly process in which tape head modules are aligned and bonded together by an adhesive such as glue, for example, which is then cured, beam support members in accordance with the present description can maintain satisfactory alignment of the modules after the adhesive has cured, notwithstanding that the modules are positioned in a staggered arrangement of a tilted head suitable for skew-based compensation.

In one embodiment, a beam support member of a tape head module such as a writer module, for example, has an alignment leg portion projecting from a body portion of the beam support member at a position displaced or offset from the ends of the beam support member. As explained in greater detail below, such positioning of the alignment leg portions of the beam support member facilitates aligning and bonding the beam support member of one module to the beam support member of another tape head module, such as a reader module, for example, in a staggered orientation. Such a staggered orientation in turn facilitates mounting the tape head modules in a tilted orientation within a tape head actuator. Moreover, it has been found that such alignment leg portion positioning reduces shifting of the modules out of alignment over time such as over the course of the bonding process including both during and after curing of adhesive bonds.

In another aspect of a tilted head in accordance with the present description, the support surface of a body portion of a beam support member of a tape head module such as a writer module, for example, extends beyond the end of the wafer chiplet disposed on the beam support member. Such lengthening of the beam support member fully accommodates the wafer chiplet such that the wafer chiplet can be fully supported by the beam support member over the entire footprint of the wafer chiplet, as described in greater detail below.

In still another aspect of a tilted head in accordance with the present description, an edge at one end of a beam support member of a tape head module such as a writer module, is chamfered so as to reduce the overall length of staggered modules of the tape head assembly. In one embodiment, a tilted tape head assembly includes two writer modules, both of which have beam support member edges chamfered at one end to reduce the overall length of the staggered modules of the tilted tape head assembly. As a result, mounting of the tilted head assembly into an actuator of the tape drive, is facilitated.

The following description is made for the purpose of illustrating the general principles of the present invention and is not meant to limit the inventive concepts claimed herein. Further, particular features described herein can be used in combination with other described features in each of the various possible combinations and permutations.

Unless otherwise specifically defined herein, all terms are to be given their broadest possible interpretation including meanings implied from the specification as well as meanings understood by those skilled in the art and/or as defined in dictionaries, treatises, etc. Representations of components have been simplified and proportions varied within the figures for purposes of clarity in presentation.

FIG. 1 illustrates a storage system which includes a tape drive 100 employing a tilted tape head 110 in accordance with the present description. While one specific implementation of a tape drive is shown in FIG. 1, it should be noted that the embodiments described herein may be implemented in the context of any type of tape drive system employing magnetoresistive tape media. In some embodiments, the tape drive 100 may represent a half-height tape drive and in other embodiments, the tape drive 100 may represent a full-height tape drive. Furthermore, it is appreciated that embodiments described herein may be implemented in other types of storage devices having write or read heads for storing or retrieval of data on other types of magnetoresistive media, such as disk drives having sliders, for example. As used herein, the term "magnetoresistive" or more simply "magnetic" is applicable to heads and media employing various magnetoresistive technologies including Giant Magnetoresistive ("GMR"), Tunneling Magnetoresistive ("TMR"), and Magnetoresistive ("MR") technologies.

As shown, a tape supply cartridge 120 and a take-up reel 121 are provided to support a magnetoresistive tape 122 referred to herein as magnetic tape, or simply tape 122. One or more of the reels may form part of a removable cartridge and are not necessarily part of the system 100. The tape drive, such as that illustrated in FIG. 1, may further include drive motor(s) to drive the tape supply cartridge 120 and the take-up reel 121 to move the tape 122 over the tape head 110. The head 110 includes one or more arrays of transducers such as reader, writer, and servo transducers.

Guides 125 guide the tape 122 across the tape head 110 which is in turn coupled to a controller 128 via a cable 130. The controller 128 typically controls head functions such as servo following, writing, reading, etc. The controller may operate under logic known in the art or which may be subsequently developed, modified as appropriate for the tape head 110 of the present description, as well as any logic disclosed herein. The cable 130 may include read/write circuits to transmit data to the head 110 to be recorded on the tape 122 and to receive data read by the head 110 from the tape 122. An actuator 132 is configured to control position of the head 110 relative to the tape 122. An interface 134 may also be provided for communication between the tape drive and a host (integral or external) or other computer 140 of the storage system to send and receive the data and for controlling the operation of the tape drive and communicating the status of the tape drive to the host, all as will be understood by those of skill in the art.

The storage system represented by the tape drive 100 may include an automated tape library for example, having one or more tape drives 100 docked in the library system. An example of such a tape library is an LTO tape library such as the TS4500 marketed by IBM, which has been modified to include tape drives having tape heads in accordance with the present description.

The computer 140 represents one or more of host computers, user computers, workstations, storage controllers, or other computers coupled to each other and to the tape drive 100 by one or more networks 150. In one embodiment, a host computer 140 coupled to the tape drive 100 receives requests over a network from user computers to access data in tape cartridges 120 internal to the tape library using tape drives 100 of the tape library. The computer 140 may be an enterprise computer system in which aspects of a storge system in accordance with the present description may be realized. Examples of enterprise-wide applications include, without limitation, banking transactions, payroll, warehouse, transportation, and batch jobs.

The magnetic tape 122 (FIG. 1) passes over the tape or media facing surfaces 152 of the tape head 110 in linear, longitudinal forward and reverse (or backward) directions which are generally parallel to the directions represented by an arrow 160. The longitudinal motion of the tape 122 is provided by actuators which includes reels 120, 121 (FIG. 1). For example, the tape drive uses motors that rotate reels to move the magnetic tape 122 in the linear, longitudinal directions represented by the arrow 160 past the media facing surfaces 152 of the tape head 110. In this embodiment, the arrow 160 represents the linear, longitudinal directions of motion of the tape caused when being wound and unwound from the reels 120, 121 of the tape drive 100.

Media facing surfaces as that term is used herein, are sometimes referred to as "tape bearing surfaces" or "air bearing surfaces." While the term "tape bearing surface" appears to imply that the surface facing the tape is in physical contact with the tape, this is not necessarily the case. Rather, typically only a portion of the tape may be in contact with the tape bearing surface, constantly or intermittently, with other portions of the tape riding (or "flying") above the tape bearing surface on a layer of air, sometimes referred to as an "air bearing" or a cushion of air. Thus, a tape bearing surface is often referred to as an "air bearing surface." As used herein, a tape described as "passing" over a media facing surfaces includes the tape either being in contact with the media facing surface or the tape flying over the media facing surface.

Figure 2:
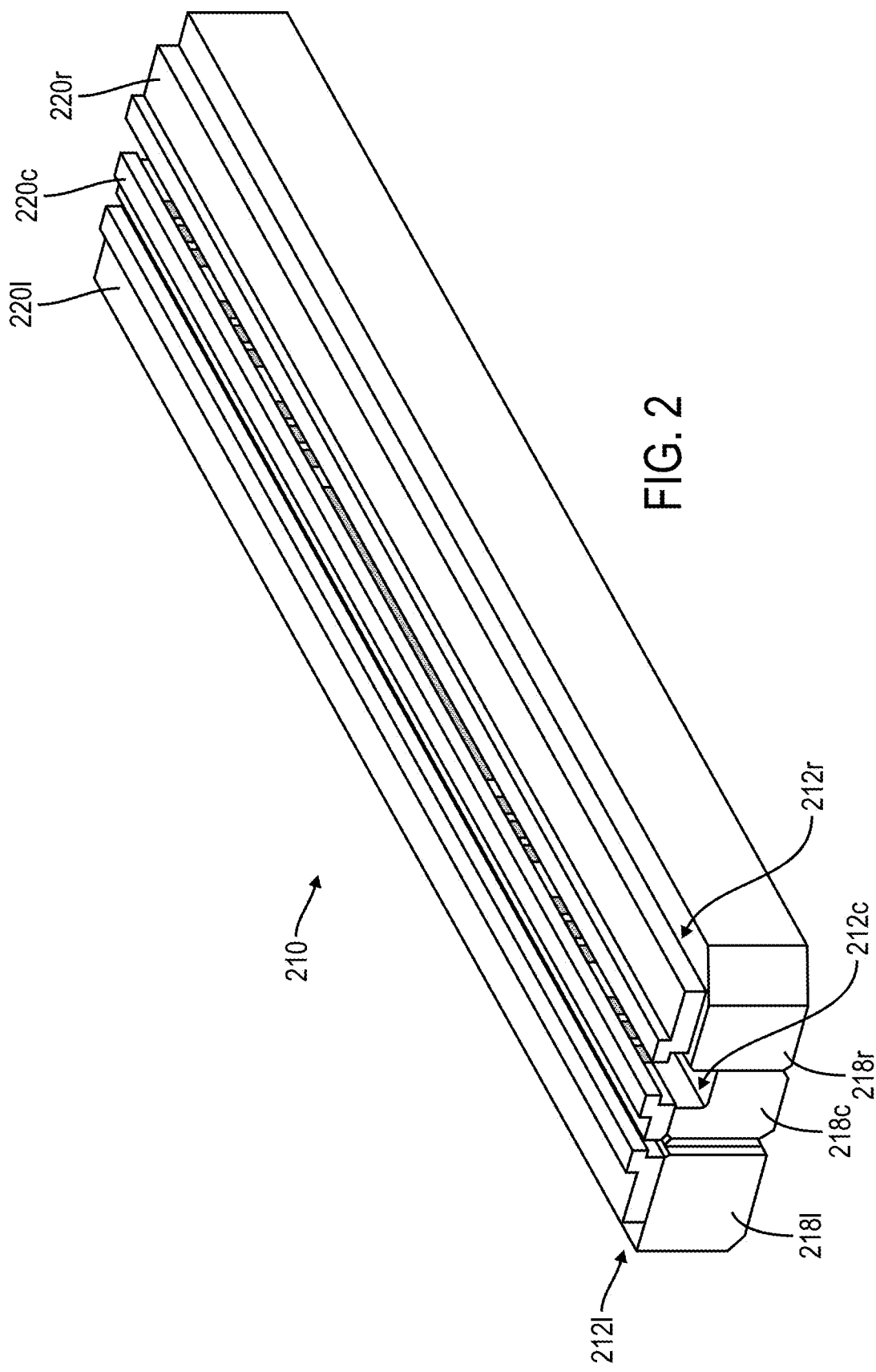
FIG. 2 is an isometric view of one embodiment of a tape head assembly for the tilted tape head for the data storage system of FIG. 1.

FIG. 2 is an isometric view of one embodiment of a tape head assembly 210 for a tilted tape head 110 (FIG. 1) in accordance with the present description. In this example, the tape head assembly 210 includes three modules, a left writer module 212*l*, a center reader module 212*c* and a right writer module 212*r*, which are bonded together to provide a read-while-write capability. The left writer module 212*l* includes a left beam support member 218*l* on which is disposed a left wafer chiplet 220*l* which includes a linear array of writer transducers and servo transducers. The center reader module 212*c* includes a center beam support member 218*c* on which is disposed a center wafer chiplet 220*c* which includes a linear array of reader transducers. The right writer module 212*r* includes a right beam support member 218*r* on which is disposed a right wafer chiplet 220*r* which includes another linear array of writer transducers and servo transducers. Although one embodiment is described for purposes of illustration as having three modules, it is appreciated that a tape head assembly in accordance with the present description may have two, three, or more modules. In addition, the wafer chiplet of a module may have both writer transducers and reader transducers as well as servo transducers.

Figure 3A:
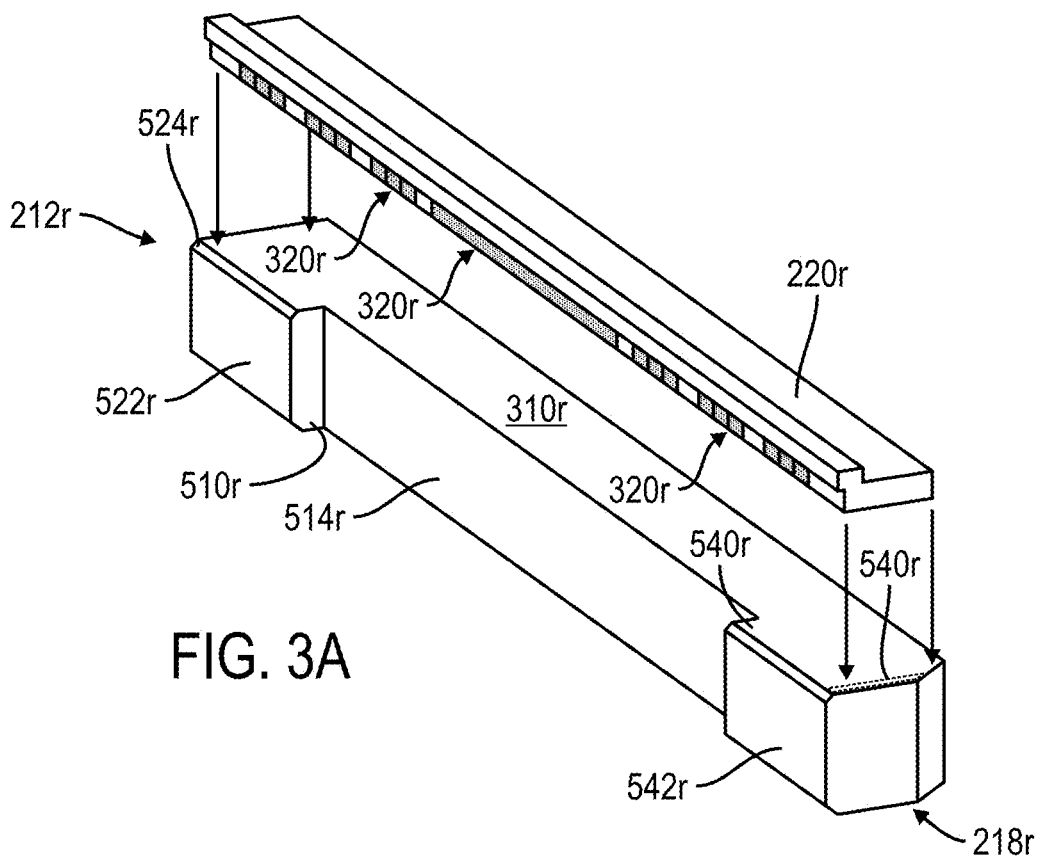
FIG. 3A depicts assembly of a wafer chiplet and one embodiment of a right beam support member of a right writer module for the tape head assembly of FIG. 2, in accordance with one embodiment of the present disclosure.
Figure 3B:
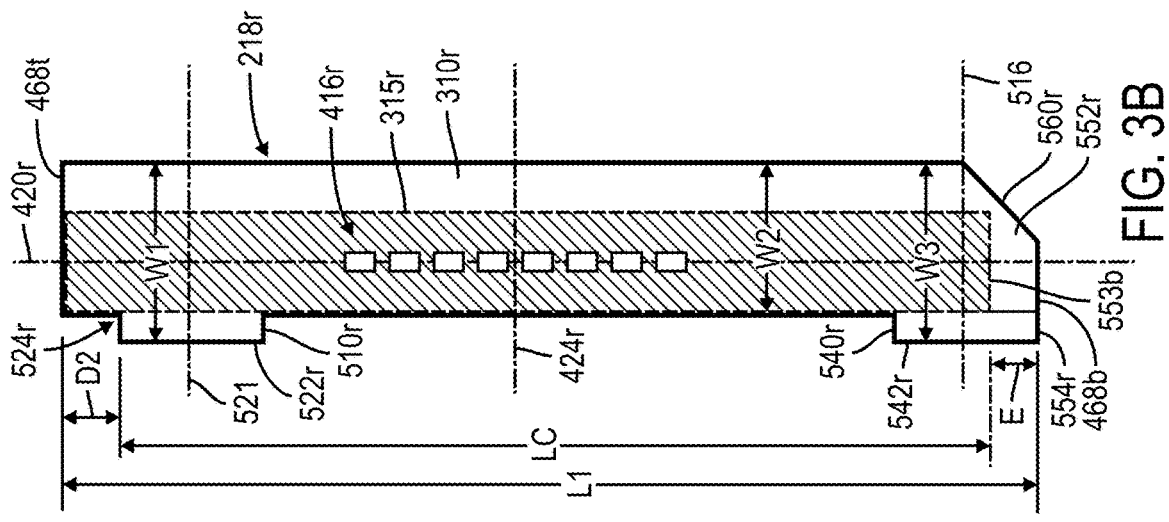
FIG. 3B is a top schematic view of one embodiment of the right writer module for the tape head assembly of FIG. 2.

The wafer chiplets 220*l*, 220*c* and 220*r* are bonded to a top surface of each beam support member 218*l*, 218*c* and 218*r*, respectively. For example, FIG. 3A depicts one embodiment of the wafer chiplet 220*r* being bonded to the top surface 310*r* of the right beam support member 218*r* of the tape head module 212*r*. The wafer chiplet 220*r* is represented in FIG. 3B in simplified form as a dotted line footprint 315*r* of the wafer chiplet 220*r* which has been bonded to top surface 310*r* of the right beam support member 218*r* as described above in connection with module 212*r* in FIG. 3A. Similarly, the wafer chiplet 220*l* of the left writer module 212*l* is represented in FIG. 3C in simplified form as a dotted line footprint 315*l* of the wafer chiplet 220*l* which has been bonded to top surface 310*l* of the beam support member 218*l* of the left writer module 212*l* in a manner similar to that described above in connection with the right writer module 212*r* in FIG. 3A.

Each wafer chiplet has bonding pads to which connectors of the tape head assembly are connected to provide electrical connections to the electrical components of the wafer chiplet such as the transducers of the wafer chiplets. For example, FIG. 3A depicts such bonding pads 320*r* of the wafer chiplet 220*r* of the right writer module 212*r*. In one embodiment, the bonding pads of the chiplet 220*l* of the left writer module 212*l* are the same as those depicted in FIG. 3A. The bonding pads of the wafer chiplet 220*c* of the center reader module 212*c* are similar to those depicted in FIG. 3A and modified as appropriate since the center reader module 212*c* has reader transducers rather than writer transducers in this embodiment.

Figure 4A:
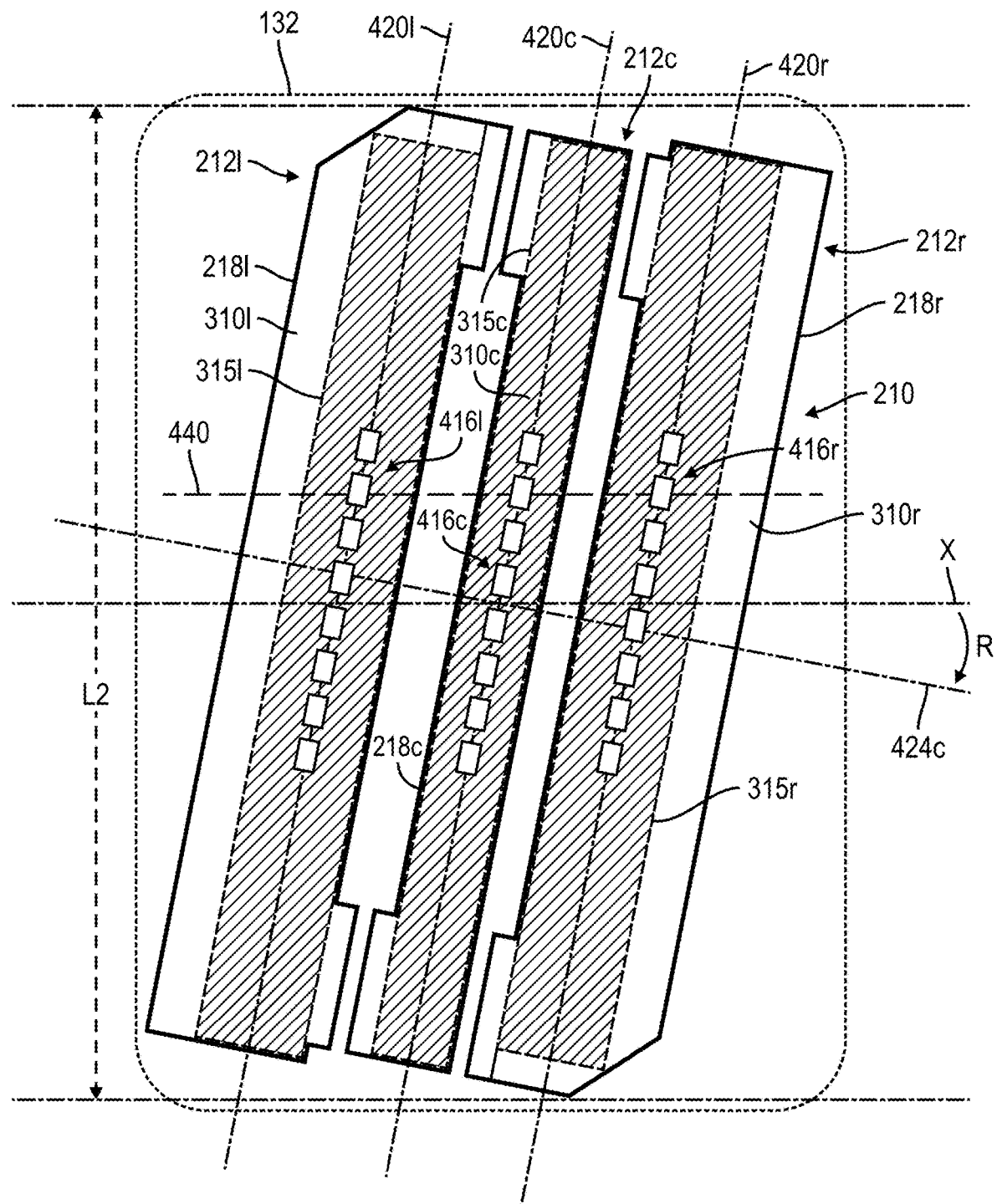
FIG. 4A is a top schematic view of staggered modules of the tape head assembly of FIG. 2, mounted in a tape drive actuator, in accordance with one embodiment of the present disclosure.
Figure 4C:
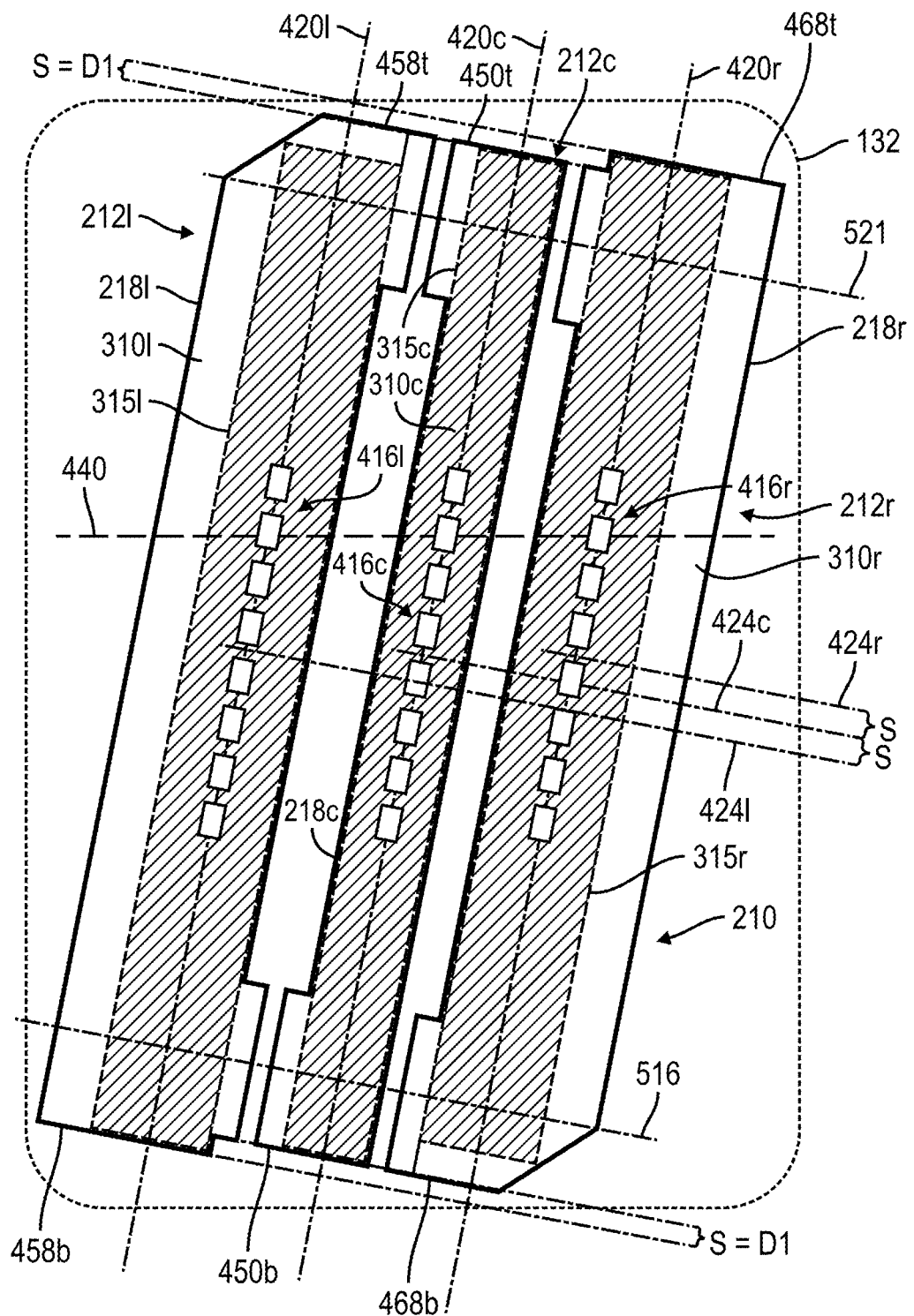
FIG. 4C is another top schematic view of the staggered modules of the tape head assembly of FIG. 2, mounted in a tape drive actuator, in accordance with one embodiment of the present disclosure.
Figure 4D:
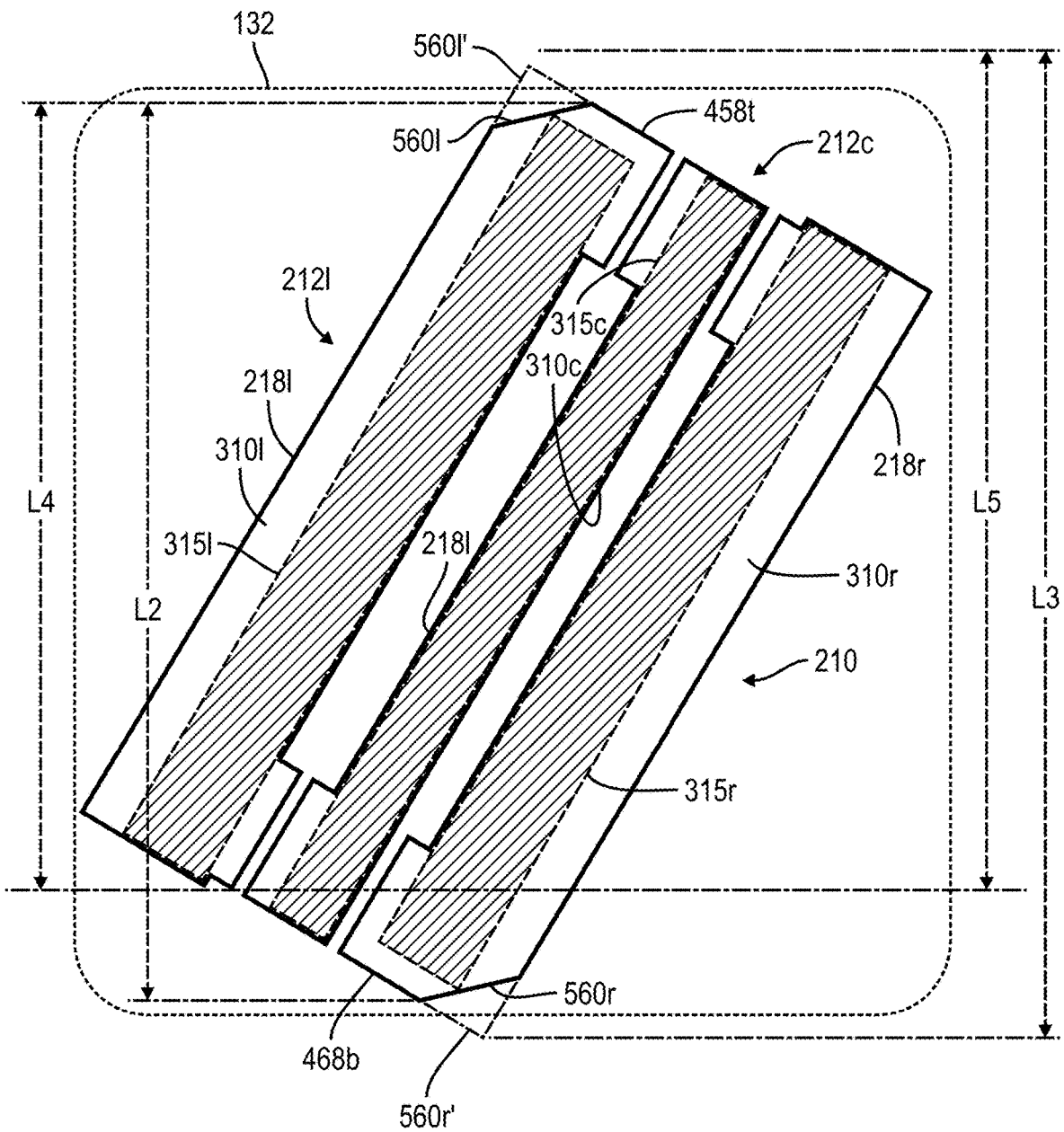
FIG. 4D is another top schematic view of the staggered modules of the tape head assembly of FIG. 2, mounted in a tape drive actuator, in accordance with one embodiment of the present disclosure.

FIGS. 4A-4D are each a top, schematic view of the tape head assembly 210 in which the tilted head assembly 210 is represented in a highly schematic and simplified representation for purposes of clarity. For example, the wafer chiplets 220*l*, 220*c* and 220*r* (FIG. 2) are represented in FIGS. 4A, 4C, 4D in simplified form as dotted line chiplet footprints 315*l* (FIG. 4A), 315*c*, 315*r*, respectively, bonded to top surfaces 310*l* (FIG. 4A), 310*c*, 310*r* of the beam support members 218*l*, 218*c*, and 218*r*, respectively, in a similar manner as described above in connection with right writer module 212*r* in FIGS. 3A, 3B. In addition, the beam support members 218*l* (FIG. 4A), 218*c*, and 218*r* are represented in FIGS. 4A, 4C, 4D schematically and spaced from each other for purposes of clarity. However, when assembled, bonding surfaces of the beam support members 218*l*, 218*c*, and 218*r* are closely bonded together as shown in FIG. 2 and as explained in greater detail below.

The tape head assembly 210 is mounted in the head actuator 132 (FIGS. 1, 4A-4D) of the tape drive 100. The head actuator 132 is represented in phantom and in a highly schematic and simplified representation as an envelope for purposes of clarity. For skew-based TDS compensation, the tape drive 100 (FIG. 1) is, in one embodiment, operated so that each module 212*l*, 212*c* and 212*r* of the tilted tape head assembly 210 has a nominal, non-zero rotation angle R such as R=7.5 degrees, for example, relative to the longitudinal direction of tape travel as represented by the arrow 160 (FIGS. 1, 4B), which is parallel to an x axis of an x-y coordinate system. As best seen in FIG. 4B, the x-y coordinate system is in the plane of the face of the tape 122. The y axis is orthogonal to the x axis and extends vertically and between the top and bottom edges, 410*t*, 410*b* (FIG. 4B), respectively, of the tape 122.

As used herein, a rotation angle R that is in a clockwise direction relative to the longitudinal direction of tape travel is expressed as a positive value, such as a clockwise rotation angle R=+10 degrees, for example, as viewed from the tape bearing surface of the head. Conversely, a rotation angle that is in a counter-clockwise direction relative to the longitudinal direction of tape travel is expressed as a negative value, such as a counter-clockwise rotation angle R=−10 degrees, for example, as viewed from the tape bearing surface of the head. Thus, a tape head rotated at an angle of R=−10 degrees is rotated at an angle of 10 degrees, but in a counter-clockwise direction relative to the longitudinal direction of tape travel.

The rotation angle R is depicted in FIG. 4A as the angle R between a transverse axis of each module 212*l*, 212*c* and 212*r* of the tilted tape head assembly 210, and the longitudinal direction of tape travel parallel to the x axis in FIG. 4A. Each chiplet 220*l*, 220*c*, 220*r* of each module 212*l*, 212*c* and 212*r*, respectively, has a linear array of transducers 416*l*, 416*c* and 416*r*, respectively. Each linear array of transducers 416*l*, 416*c*, 416*r* defines a longitudinal axis which is orthogonal to the transverse axis of each module 212*l*, 212*c* and 212*r*. For example, FIG. 4A depicts a longitudinal axis 420*c* defined by the linear array 416*c* of the center reader module 212*c*. In the illustrated embodiment, the longitudinal axis 420*c* of the transducer array 416*c* of the center reader module 212*c* also represents a longitudinal axis of the center chiplet 220*c* and also the center beam support member 218*c* of the center reader module 212*c* as well as the center module 212*c* itself.

In a similar manner, the longitudinal axis 420*l* (FIG. 3C) defined by the transducer array 416*l* of the left writer module 212*l* also represents a longitudinal axis of the left chiplet 220*l* and the left beam support member 218*l* of the left writer module 212*l* as well as the left writer module 212*l* itself. Similarly, the longitudinal axis 420*r* (FIG. 3B) defined by the transducer array 416*r* of the right writer module 212*r* also represents a longitudinal axis of the right chiplet 220*r* and the right beam support member 218*r* of the right writer module 212*r* as well as the right writer module 212*r* itself.

The rotation angle R of the center reader module 212*c* of the tilted tape head assembly 210, is depicted in FIG. 4A as the angle R between a transverse axis 424*c* of the center reader module 212*c* of the tilted tape head assembly 210, and the longitudinal direction of tape travel parallel to the x axis in FIG. 4A. The transverse axis 424*c* is centered within the linear array 416*c* of transducers and is orthogonal to the longitudinal axis 420*c* of the center reader module 212*c*.

In the illustrated embodiment, the linear arrays 416*l*, 416*c* and 416*r* of transducers of the modules 212*l*, 212*c* and 212*r*, respectively, are each parallel to each other. Hence, in the illustrated embodiment, the left writer module 212*l* is rotated at the same rotation angle R as the rotation angle R of the center reader module 220*c*. The rotation angle R of the left writer module 212*l* of the tilted tape head assembly 210, is the angle R between a transverse axis 424*l* (FIGS. 3C, 4C) of the left writer module 212*l* of the tilted tape head assembly 210, and the longitudinal direction of tape travel parallel to the x axis in FIG. 4A. Similarly, the right writer module 212*r* is rotated at the same rotation angle R as the rotation angle R of the center reader module 212*c* depicted in FIG. 4A. The rotation angle R of the right writer module 212*r* of the tilted tape head assembly 210, is the angle R between a transverse axis 424*r* (FIGS. 3B, 4C) of the right writer module 212r of the tilted tape head assembly 210, and the longitudinal direction of tape travel parallel to the x axis in FIG. 4A. Each of the parallel longitudinal axes 420l, 420c, 420r define a nominal tilt angle at which the modules 212l, 212c, 212r, respectively are tilted within the head assembly 210 when mounted within the actuator 132.

Referring to FIG. 4B, the actuator 132 imparts a lateral motion to the tilted tape head assembly 210 along a lateral axis 430 which is generally orthogonal to the longitudinal direction of tape travel parallel to the x axis. Each of the parallel longitudinal axes 420l, 420c, 420r (FIG. 4A) the modules 212l, 212c, 212r, respectively, define a nominal tilt angle relative to the axis 430 when mounted in the actuator 132.

The actuator 132 also imparts a pivotal motion to the tape head assembly 210 around a pivot point P in the center of the tape head assembly 210. Such pivotal motion changes the rotational angle R (FIG. 4A) of the tape head assembly 210 of each of the transducer arrays 416l, 416c, 416r with respect to the longitudinal direction of tape travel parallel to the x axis. In the illustrated embodiment, the data tracks having data being written to or read from the tape 122 are parallel to the longitudinal direction of tape travel which is parallel to the x axis. Thus, the rotational angle R (FIG. 4A) of the tape head assembly 210 represents the skew angle of the each of the transducer arrays 416l, 416c, 416r relative to the data tracks of the tape 122 for skew-based compensation.

Using known techniques of skew based compensation modified as appropriate for a tilted tape head in accordance with the present description, the lateral position of the tape head assembly 210 within the face of the moving tape 122, and the amount of contraction or expansion of the face of the tape 122, are measured by servo transducers of a transducer array of the tape head assembly 210 and in response, the lateral and skew positions of the tape head assembly 210 are continuously adjusted by the actuator 132 as the tape 122 moves past the tape head assembly 210, to align the reader and writer transducers of the transducer arrays 416l, 416c, 416r with data tracks of the tape 122.

As previously mentioned, the linear transducer arrays 416l, 416c and 416r are parallel to each other along their longitudinal axes 420l, 420c, 420r, respectively, in the tape head assembly 210, as shown in FIG. 4A. In one aspect of a tilted tape head in accordance with the present description, the center transverse axes 424l, 424c, 424r of the transducer arrays 416l, 416c, 416r, respectively, are not aligned but are displaced or offset relative to each other in a staggered orientation by a stagger displacement distance S of adjacent modules as shown in FIG. 4C. In one embodiment, in this staggered orientation, the reader elements of the center array 416c are aligned to the respective writer elements of the left and right arrays 416l, 416r, respectively, as well as their air (or tape) bearing surfaces. For example, FIGS. 4A, 4C depict an alignment axis 440 in which a reader element and the associated air/tape bearing surface of the center array 416c are aligned to a writer element and the associated air/tape bearing surface of the left array 416l and are also aligned to a writer element and the associated air/tape bearing surface of the right array 416r, as indicated by the alignment axis 440. It is believed that such a staggered orientation of the modules 212l, 212c, 212r facilitates operating the tape head assembly 210 in a tilted orientation for skew-based compensation.

In one embodiment, during write operations, a read operation is performed immediately after the data is written in a Read-While-Write operation, to verify that the data was written properly. In order to achieve this, the reader is aligned with its associated writer as described above so that the written track can be verified.

In one embodiment, when the head rotates to a specified tilt angle such as R=10 degrees, for example, the transducers elements of each row of the transducer arrays 416l, 416c, 416r will lie on the same horizontal such as depicted by the axis 440. However, it is appreciated that in some embodiments, the reference ultimately is the servo patterns on the tape. For example, if the servo patterns are written to achieve a 10 degree head rotation, the head will automatically rotate until it matches the servo pattern and thus, will be at a rotation of 10 degrees. However, it is appreciated that if the servo pattern of a particular embodiments is not written to provide a rotation of 10 degrees, but instead to 10.1 degrees, for example, the head will in some embodiments, rotate to 10.1 degrees. In that case, the transducers elements of each row may no longer lie on the same horizontal, in some embodiments. It is appreciated that a tilted tape head in accordance with the present description may have other nominal degrees of rotation R.

In the illustrated embodiment, the stagger displacement distance S may be equal to 150 microns, for example. It is appreciated that the stagger displacement distance S may vary depending upon the particular application. For example, the stagger displacement distance S may be in a range of 100 to 200 microns, for example. The stagger displacement distance S may also vary as a function of the nominal rotation angle R of the modules of the tape head assembly.

Figure 9:
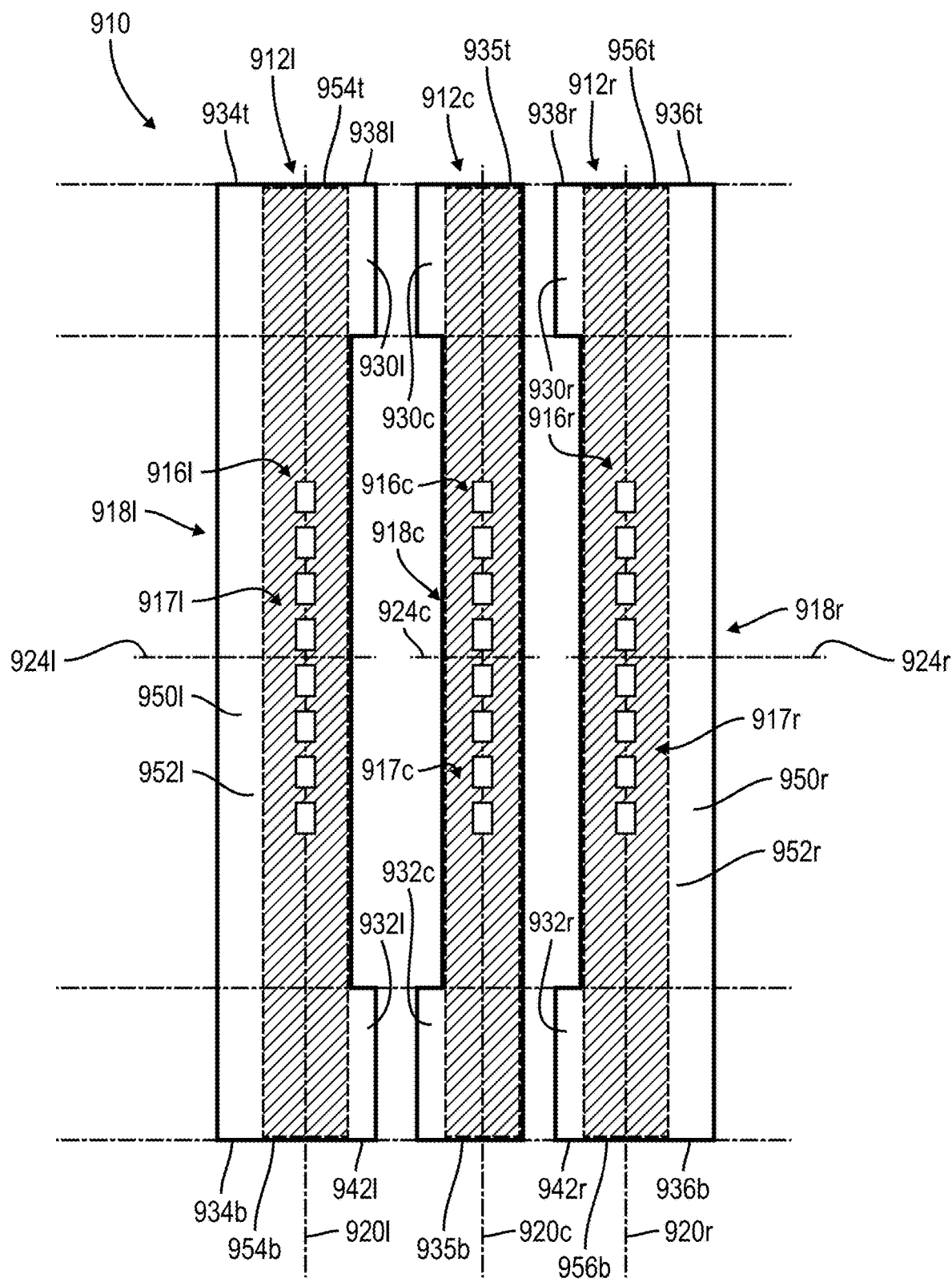
FIG. 9 depicts a known tape head assembly having known modules in a known non-staggered orientation.

By comparison, FIG. 9 shows a known tape head assembly 910 of a known left writer module 912l, known center reader module 912c and known right writer module 912r in which linear transducer arrays 916l, 916c and 916r of wafer chiplets 917l, 917c, 917r, respectively, are also parallel to each other along their longitudinal axes 920l, 920c, 920r, respectively, in the tape head assembly 910, as shown in FIG. 9. However, the center transverse axes 924l, 924c, 924r of the transducer arrays 916l, 916c, 916r, respectively, are aligned and are not displaced or offset relative to each other in a non-staggered orientation. By comparison, it is believed that a staggered orientation of the modules of a tape head assembly such as the assembly 210 of the present description, provides improved operation in a tilted orientation for skew-based compensation.

In one embodiment, the stagged orientation depicted in FIG. 4C is provided by staggering the modules 212l, 212c, 212r so that the bottom end 450b of the center beam support member 218c of the center reader module 212c is displaced from the bottom end 458b of the left beam support member 218l of the left writer module 212l. In addition, the top end 468t of the right beam support member 218r of the right writer module 212r is displaced from the top end 450t of the beam support member 218c of the center reader module 212c.

In the illustrated embodiment, the tilted position of the tape head assembly 210 is represented by the tilt angle of the parallel longitudinal axes 420l, 420c, 420r of the modules 212l, 212c, 212r, respectively, such that the parallel longitudinal axes 420l, 420c, 420r define a tilt direction of the tape head assembly 210. The stagged orientation depicted in FIG. 4C is provided by positioning the bottom end 450b of the center beam support member 218c of the center reader module 212c so that it is displaced from the end 458b of the left beam support member 218l of the left writer module 212l by a distance D1 equal to the stagger distance S in the direction of tilt of the tape head assembly 210. In addition, the top end 468t of the beam support member 218r of the right writer module 212r is displaced in the tilt direction from the top end 430t of the beam support member 218c of the center reader module 212c by the distance S. As noted above, the center transverse axes 424l, 424c, 424r of the transducer arrays 416l, 416c, 416r, respectively, are displaced or offset relative to each other in a staggered orientation by the stagger displacement distance S of adjacent modules as shown in FIG. 4C.

By comparison, in the known tape head assembly 910 (FIG. 9), the bottom end 934b of the beam support member 918l of the left writer module 912l is not displaced from the bottom end 935b of the center beam support member 918c of the center reader module 912c but is instead aligned and flush with the bottom end 935b of the center beam support member 918c of the center reader module 912c. Similarly, the top end 936t of the right beam support member 918r of the right writer module 912r is not displaced from the top end 935t of the center beam support member 918c of the center reader module 912c but is instead aligned and flush with the top end 935t of the center beam support member 918c of the center reader module 912c. By comparison, it is believed that a staggered orientation of the modules of a tape head assembly in accordance with the present description, as shown in FIGS. 4A, 4C, 4D, improves operating the tape head in a tilted orientation for skew-based compensation.

In one aspect of a tilted tape head for active skew-based TDS compensation in accordance with the present description, the beam support members 218l, 218r of the left writer module 212l and the right writer module 212r, respectively, each have an alignment leg portion projecting from a body portion of the beam support member at a displaced position. More specifically, each such displaced alignment leg portion has a bonding surface spaced or offset from the ends of the body portion of the support member so that the alignment leg portion is positioned between the ends of the body portion of the support member instead of at one of the ends of the body portion. The bonding surface of each such displaced alignment leg portion is adapted to bond with a bonding surface of an adjacent module of the tape head assembly.

Figure 5:
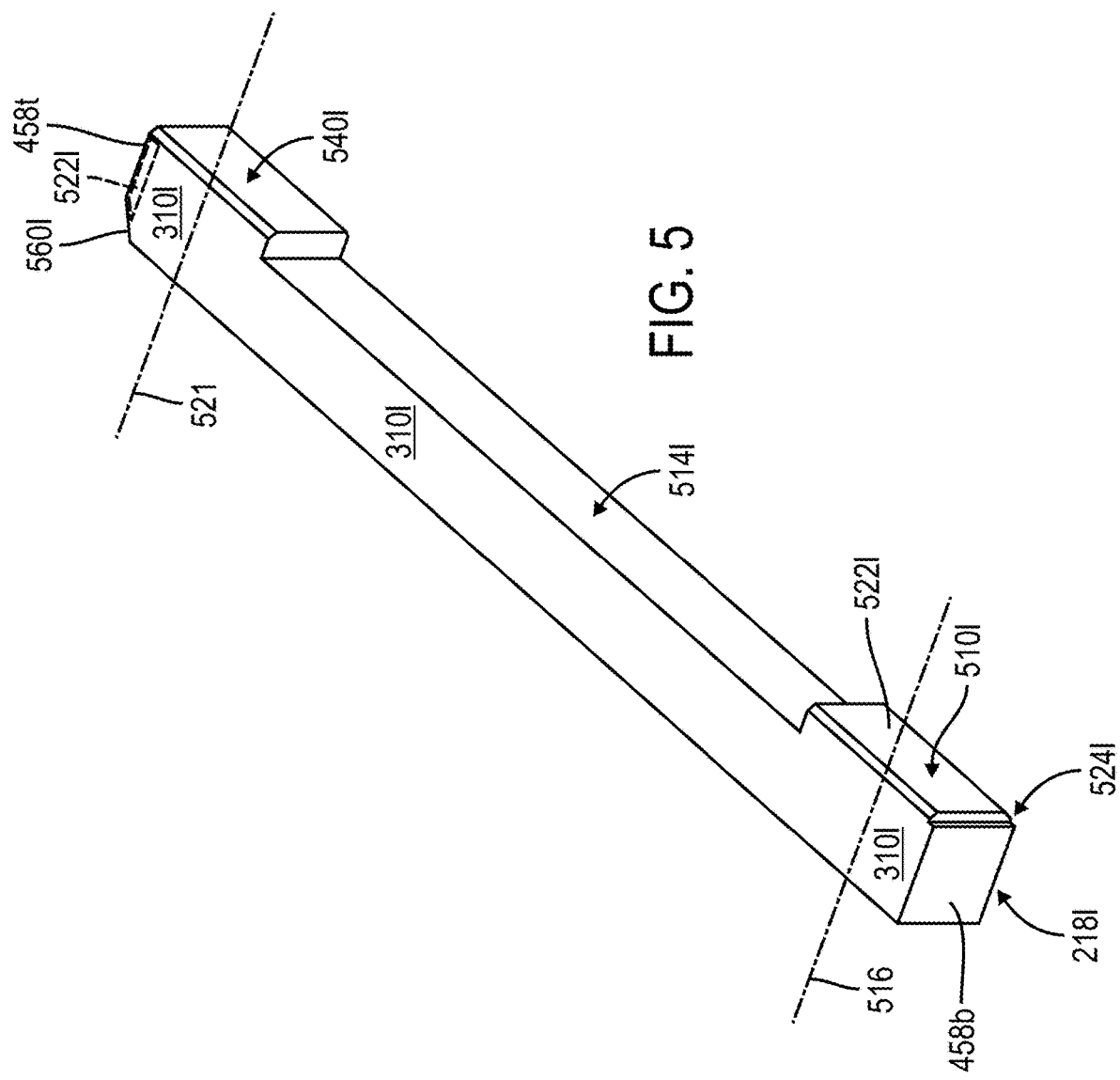
FIG. 5 is an isometric view of one embodiment of a left beam support member for a left writer module, for the tape head assembly of FIG. 2, in accordance with one embodiment of the present disclosure.

For example, as best seen in FIG. 5, the left beam support member 218l of the left writer module 212l has an alignment leg portion 510l projecting from a body portion 514l of the beam support member 218l along a transverse axis 516 (FIGS. 3C, 4C) which is orthogonal to the longitudinal axis 420l (FIG. 3C) of the left writer module 212l. The alignment leg portion 510l has a bonding surface 522l (FIG. 5) at a position displaced from the top end 458t and also displaced from the bottom end 458b of the beam support member 218l. Thus, the alignment leg portion bonding surface 522l is spaced from both the ends 458t, 458b of the body portion 514l of the left support member 218l but is positioned closer to the proximal bottom end 458b than to the distal top end 458t in this embodiment.

As best seen in FIG. 3C, the beam support member 218l has a longitudinal length L1 in the direction parallel to the longitudinal axis 420l of the module 212l. Because the alignment leg portion 510l projects from the body portion 514l, the beam support member 218l has a width W1 at the alignment leg portion 510l, which is wider than the width W2 of the body portion 514l without an alignment leg portion. The widths W1, W2 are in the direction parallel to the transverse axis 516 and orthogonal to the longitudinal axis 420l of the module 212l.

The displacement of the bonding surface 522l of the alignment leg portion 510l from the proximal bottom end 458b of the beam support member 218l of the left writer module 212l (FIG. 2) is formed by a notch 524l (FIGS. 3C, 5) formed in the left support member 218l between the alignment leg portion 510l and the proximal bottom end 458b of the beam support member 218l. The notch 524l is represented in FIG. 3C as an offset or displacement D2 which is exaggerated in FIG. 3C for purposes of clarity. The bonding surface 522l of the alignment leg portion 510l of the beam support member 218l is adapted to bond with an opposing bonding surface 525c (FIG. 3D) of an alignment leg portion 526c of the center reader module 212c as described in greater detail below.

In the illustrated embodiment, the displacement D2 between the alignment leg portion 510l and the proximal bottom end 458b of the beam support member 218l, matches the stagger displacement distance S, D1 (FIG. 4C) between the proximal bottom end 458b of the beam support member 218l, and the bottom end 450b of the center beam support member 218c of the center reader module 212c. As explained in greater detail below, such positioning of these elements of the tape head assembly facilitates alignment and bonding of the elements in the staggered orientation of FIG. 4C. For example, it has been found that such alignment leg portion displaced positioning reduces shifting of staggered modules out of alignment over time such as over the course of the bonding process including both during and after curing of adhesive bonds.

In one embodiment of the tilted tape head assembly 210 (FIG. 4A) for skew-based compensation in accordance with the present description, the right beam support member 218r of the right writer module 212r is constructed the same as the beam support member 218l of the left writer module 212l, but is oriented within the head assembly 210 at 180 degrees from the orientation of the left beam support member 218l of the left writer module 212l as shown in FIG. 4A. Accordingly, as best seen in FIGS. 3A, 3B, the right beam support member 218r of the right writer module 212r has an alignment leg portion 510r projecting from a body portion 514r of the beam support member 218r along a transverse axis 521 (FIGS. 3B, 4C) which is orthogonal to the longitudinal axis 420r of the right writer module 212l as shown in FIG. 3B. The alignment leg portion 510r has a bonding surface 522r at a position displaced from the proximal top end 468t and also displaced from the distal bottom end 468b of the beam support member 218r. The displacement of the bonding surface 522r of the alignment leg portion 510r from the proximal top end 468t of the beam support member 218r of the right writer module 212r (FIG. 2) is represented in FIG. 3B as the offset or displacement D2 which is exaggerated in FIG. 3B for purposes of clarity. The bonding surface 522r of the alignment leg portion 510r of the beam support member 218r is adapted to bond with an opposing bonding surface 530c (FIG. 3D) of the center reader module 212c as described in greater detail below.

The right beam support member 218r has a longitudinal length L1 in the direction parallel to the longitudinal axis 420r of the module 212r. Because the alignment leg portion 510r projects from the body portion 514r, the beam support member 218r has a width W1 at the alignment leg portion 510r, which is wider than the width W2 of the body portion 514r without an alignment leg portion. The widths W1, W2 are in the direction parallel to the transverse axis 521 and orthogonal to the longitudinal axis 420r of the module 212r.

The displacement D2 of the bonding surface 522r of the alignment leg portion 510r from the proximal top end 468t of the beam support member 218r of the right writer module 212r (FIG. 2) is formed by a notch 524r formed in the support member 218r between the alignment leg portion 510r and the proximal top end 468t of the beam support member 218r. In the illustrated embodiment, the displacement D2 between the alignment leg portion 510r and the proximal top end 468t of the right beam support member 218r, matches the stagger displacement distance S, D1 (FIG. 4C) between the proximal top end 468t of the right beam support member 218r, and the top end 450t of the center beam support member 218c of the center reader module 212c. As explained in greater detail below, such positioning of these elements of the tape head assembly facilitates alignment and bonding of the elements in the staggered orientation of FIG. 4C. For example, it has been found that such alignment leg portion displaced positioning reduces shifting of staggered modules out of alignment over time such as over the course of the bonding process including both during and after curing of adhesive bonds.

By comparison, the known beam support members 918l, 918r (FIG. 9) of the known left writer module 912l and the right writer module 912r, respectively of the known tape head assembly 910, do not have a displaced alignment leg portion positioned between the ends of a beam support member. Instead, the alignment leg portions 930l, 932l of the left writer module 912l are both positioned at the top and bottom ends 934t, 934b, respectively of the left beam support member 918l, so that the top and bottom edges 938l, 942l of the alignment leg portions 930l, 932l, respectively, of the left writer module 912l are both flush with the top and bottom ends 934t, 934b, respectively, of the left beam support member 918l. Similarly, the alignment leg portions 930r, 932r of the right writer module 912r are both positioned at the top and bottom ends 936t, 936b, respectively, of the beam support member 918r so that the top and bottom edges 938r, 942r of the alignment leg portions 930r, 932r of the right writer module 912r are both flush with the top and bottom ends 936t, 936b, respectively of the right beam support member 918r. As described in greater detail below, it is believed that such positioning of the alignment leg portions of the known beam support members 918l, 918r, does not facilitate a staggered orientation of linear arrays of transducers for a tilted head assembly for skew-based compensation. In FIG. 9, the beam support members 918l, 918c, 918r are represented schematically and spaced from each other for purposes of clarity. However, when assembled, bonding surfaces of the beam support members 918l, 918c, 918r are closely bonded together.

In one embodiment of a tilted head in accordance with the present description, and as best seen in FIG. 5, the left beam support member 218l of the left writer module 212l has a second alignment leg portion 540l projecting from the body portion 514l of the beam support member 218l along the transverse axis 521 (FIGS. 3C, 4C) 516 which is orthogonal to the longitudinal axis 420l of the left writer module. The alignment leg portion 540l has a bonding surface 542l (FIG. 5) positioned at the top end 458t of the beam support member 218l and is adapted to bond with an opposing bonding surface 544c (FIG. 3D) of an alignment leg portion 546c of the center reader module 212c as described in greater detail below. In this embodiment, the second alignment leg portion 540l is not displaced or offset from the top end 458t of the beam support member 218l but is instead generally flush with the top end 458t as best seen in FIG. 3C. However, it is appreciated that in other embodiments, the second alignment leg portion 540l and its bonding surface 542l may be displaced from the top end 458t of the beam support member 218l of the left writer module 212l (FIG. 2) in a manner similar to the displacement of the alignment leg portion 510l and its bonding surface 522l from the bottom end 458b, depending upon the particular application.

As previously mentioned, the beam support member 218l has a longitudinal length L1 (FIG. 3C) in the direction parallel to the longitudinal axis 420l of the module 212l. Because the alignment leg portion 540l projects from the body portion 514l, the left beam support member 218l has a width W3 at the alignment leg portion 540l, which is wider than the width W2 of the body portion 514l without an alignment leg portion. The widths W1, W2, W3 are in the direction parallel to the transverse axes 516, 521 and orthogonal to the longitudinal axis 420l of the module 212l.

As previously noted, in one embodiment, the beam support member 218r of the right writer module 212r is constructed in the same manner as the beam support member 218l of the left writer module 212l, but is oriented within the head assembly 210 at 180 degrees from the orientation of the beam support member 218l of the left writer module 212l as shown in FIG. 4A. Accordingly, as best seen in FIGS. 3A, 3B, the beam support member 218r of the right writer module 212r also has a second alignment leg portion 540r projecting from the body portion 514r of the beam support member 218r along the transverse axis 516 (FIGS. 3B, 4C) which is orthogonal to the longitudinal axis 420r of the right writer module 212r as shown in FIG. 3B. The alignment leg portion 540r has a bonding surface 542r (FIG. 5) positioned at the bottom end 468b of the beam support member 218r. The bonding surface 542r of the alignment leg portion 540r of the beam support member 218r is adapted to bond with an opposing bonding surface 550c (FIG. 3D) of the center reader module 212c as described in greater detail below. Thus, the alignment leg portion bonding surface 522r is not spaced from the end 468b of the body portion 514r of the support member 218r in this embodiment.

It is appreciated that in other embodiments, the bonding surface 542r of the alignment leg portion 540r may be displaced from the bottom end 468b of the beam support member 218r of the right writer module 212r (FIG. 3A) in a manner similar to the displacement of the bonding surface 522r from the top end 468t, depending upon the particular application. It is further appreciated that the beam support members 218l, 218r may have different constructions, depending upon the particular application.

As previously mentioned, the beam support member 218r has a longitudinal length L1 (FIG. 3B) in the direction parallel to the longitudinal axis 420r of the module 212r. Because the alignment leg portion 540r projects from the body portion 514r, the beam support member 218r has a width W3 at the alignment leg portion 540r, which is wider than the width W2 of the body portion 514r without an alignment leg portion. The widths W1, W2, W3 are in the direction parallel to the transverse axes 516, 521 and orthogonal to the longitudinal axis 420r of the module 212r.

In another aspect of a tilted head in accordance with the present description, the support surface of a body portion of a beam support member of a tape head module such as a writer module, for example, extends substantially beyond the distal end of the wafer chiplet disposed on the beam support member. For example, the wafer chiplet support surface 310l of the left beam support member 218l of the left writer module 212l has a portion 552l (FIG. 3C) at the top end 458t which extends a distance E beyond the top end 553t of the wafer chiplet footprint 315l disposed on the wafer chiplet support surface 310l. In one embodiment, the wafer chiplet footprint 315l has a length LC of 22.5 mm and the left support member 218l has a length of 22.65 mm such that the extension portion 552l at the top end 458t has a length E of 0.15 mm or 150 microns. It is appreciated that the length E of the extension portion 552*l* at the top end 458*t* may vary depending upon the particular application. For example, the extension portion 552*l* may be in a range of 100 to 200 microns, for example.

Similarly, the wafer chiplet support surface 310*r* (FIG. 3A) of the beam support member 218*r* of the right writer module 212*r* has a portion 552*r* at the bottom end 468*b* which extends beyond the bottom end 553*b* of the wafer chiplet footprint 315*r* (FIG. 3B) disposed on the wafer chiplet support surface 310*r*. In one embodiment, the length E of the extension portion 552*r* may also be 150 microns in length or in a range of 100 to 200 microns long at the bottom end 468*b*, for example. Such lengthening of the beam support member at one end fully accommodates the wafer chiplet such that in one embodiment, the wafer chiplet is always supported by the underlying beam support member over the entire footprint of the wafer chiplet.

Thus, the wafer chiplet footprint 315*l* of FIG. 3C is positioned wholly within the boundary of the chiplet support surface 310*l* of the left writer beam support member 218*l* so that the wafer chiplet 220*l* (FIG. 2) is more fully supported for fully bonding over its entire footprint 315*l* by the wafer chiplet support surface 310*l*. In a similar manner, the wafer chiplet footprint 315*r* of FIG. 3B is positioned wholly within the boundary of the chiplet support surface 310*r* of the right writer beam support member 218*r* so that the wafer chiplet 220*r* (FIG. 2) is more fully supported for fully bonding over its entire footprint 315*r* by the wafer chiplet support surface 310*r*.

By comparison, in the known left writer module 912*l* (FIG. 9) of the known tape head assembly 910, the known wafer chiplet support surface 950*l* of the known beam support member 918*l* of the left writer module 912*l* lacks an extension portion which extends beyond the footprint 952*l* of the wafer chiplet 917*l* disposed on the wafer chiplet support surface 950*l*. Similarly, the known wafer chiplet support surface 950*r* of the known right beam support member 918*r* of the right writer module 912*r* lacks an extension portion which extends beyond the footprint 952*r* of the wafer chiplet 917*r* disposed on the wafer chiplet support surface 950*r*. Instead, in the known tape head assembly 910, the top and bottom ends 954*t*, 954*b* of the left wafer chiplet footprint 952*l* of the wafer chiplet 917*l* coincides with the top and bottom ends 934*t*, 934*b*, respectively, of the wafer chiplet support surface 950*l*. Similarly, the top and bottom ends 956*t*, 956*b* of the right wafer chiplet footprint 952*r* of the wafer chiplet 917*r* coincide with the top and bottom ends 936*t*, 936*b*, respectively, of the wafer chiplet support surface 950*r*.

In another aspect of a tilted head in accordance with the present description, the extension portion 552*l* of the beam support member 218*l* permits a portion 5541 of the alignment leg portion 540*l* and its bonding surface 542*l* to also extend beyond the wafer chiplet footprint 315*l* of the left writer module 212*l*. Similarly, the extension portion 552*r* of the beam support member 218*r* permits a portion 554*r* of the alignment leg portion 540*r* and its bonding surface 542*r* to also extend beyond the wafer chiplet footprint 315*r* of the right writer module 212*r*.

In the illustrated embodiment, the length E of each extension portion 552*l*, 552*r* matches the displacement D2 for the alignment leg portions 510*l*, 510*r*, and matches the stagger displacement distance S, D1 (FIG. 4C). As explained in greater detail below, such positioning of these elements of the tape head assembly facilitates alignment and bonding of the elements in the staggered orientation of FIG. 4C. For example, it has been found that such alignment leg portion displaced positioning reduces shifting of staggered modules out of alignment over time such as over the course of the bonding process including both during and after curing of adhesive bonds.

In still another aspect of a tilted head in accordance with the present description, one end of a beam support member of a tape head module such as a writer module, is chamfered so as to reduce the overall length of a tilted tape head in a staggered orientation. As a result, mounting of the tilted head assembly 210 into an actuator of the tape drive, is facilitated as depicted in FIG. 4D. In one embodiment, the head assembly 210 is tilted at a nominal angle of approximately 7 degrees. However, in FIG. 4D, the tilt angle of the tilted head assembly 210 is exaggerated for purposes of clarity.

In one embodiment, the top end 458*t* (FIG. 5) of the left beam support member 218*l* of the left writer module 212*l* is chamfered as indicated at end edge 560*l* in FIGS. 3C, 4D, 5. Similarly, the bottom end 468*b* (FIGS. 3A, 3B, 4D) of the right beam support member 218*r* of the right writer module 212*l* is chamfered as indicated at end edge 560*r* in FIGS. 3A, 3B. In one embodiment, the chamfered end edges 560*l*, 560*r* have dimensions D3 of 590 microns and D4 of 690 microns. It is appreciated that the size of the chamfered end edges 560*l*, 560*r* may vary, depending upon the particular application.

By comparison, FIG. 4D depicts in phantom at 560*l'*, 560*r'* a non-chamfered embodiment. In one aspect of a tilted head in accordance with the present description, chamfering the end edges 560*l*, 560*r* of the beam support members 218*l*, 218*r*, respectively, reduces the overall length L2 (FIG. 4D) of the tape head assembly 210 in the tilted, staggered orientations depicted in FIGS. 4A, 4D as compared to the overall length L3 of an embodiment having non-chamfered ends 560*l'*, 560*r'* in a tilted, staggered orientation as shown in FIG. 4D. As a result, mounting of the tilted head assembly 210 having a reduced length into an actuator of the tape drive, is facilitated. The lengths L2, L3 depicted in FIG. 4D are oriented in the direction of the y axis (FIG. 4B) of the tape 122 of the tape drive 100 (FIG. 1).

With respect to the individual writer module beam support members, chamfering the end edge 560*l* of the beam support member 218*l*, reduces the overall length L4 (FIG. 4A) of the left beam support member 218*l* of the tape head assembly 210 in the tilted orientation depicted in FIG. 4D as compared to the length L5 of the left beam support member having a non-chamfered end 560*l'* in a tilted orientation as shown in FIG. 4D. Similarly, chamfering the end edge 560*r* of the beam support member 218*r*, reduces the overall length of the beam support member 218*r* of the tape head assembly 210 in the tilted orientation depicted in FIG. 4D as compared to the length of the beam support member having a non-chamfered end 560*r'* in a tilted orientation as shown in FIG. 4D. As noted above in connection with the lengths L2, L3, the lengths L4, L5 depicted in FIG. 4D are also oriented in the direction of the y axis (FIG. 4B) of the tape 122 of the tape drive 100 (FIG. 1).

Techniques for fabricating wafer chiplets such as the wafer chiplets 220, 220*c*, 220*r* (FIG. 2) are well known. For example, a chiplet of a head may be constructed in layers. In one embodiment, layers may be formed in a gap created above an electrically conductive substrate e.g., of AlTiC, in generally the following order for a reader module: an insulating layer, a first shield typically of an iron alloy such as NiFe (permalloy), CZT or Al—Fe—Si (Sendust), a sensor for sensing a data track on a magnetic medium, and a second shield typically of a nickel-iron alloy (e.g., 80/20 Permalloy). In another example, for a writer module, a substrate e.g., of AlTiC, followed by an insulating layer, followed by first and second writer pole tips, and a coil. The first and second writer poles may be fabricated from ferromagnetic materials such as 45/55 NiFe. Note that these materials are provided by way of example only, and other materials may be used. Additional layers such as insulation between the shields and/or pole tips and an insulation layer surrounding the sensor may be present. Illustrative materials for the insulation include alumina and other oxides, insulative polymers, etc.

Techniques for fabricating ceramic beam support members are also well known. Such fabrication techniques may include molds or machining or both, and may be modified as appropriate to accommodate left beam support members and right beam support members in accordance with the present description. In one embodiment, the left beam support member 218*l* is fabricated as a 1-piece ceramic beam support. The right beam support member 218*r* may similarly be fabricated as a 1-piece ceramic beam support. It is appreciated that in other embodiments, these beam support members may each be fabricated from separate components which are then assembled into beam support assemblies by bonding or other suitable assembly techniques. It is further appreciated that these beam support members may be fabricated from materials other than ceramic materials, depending upon the particular application.

Figure 6:
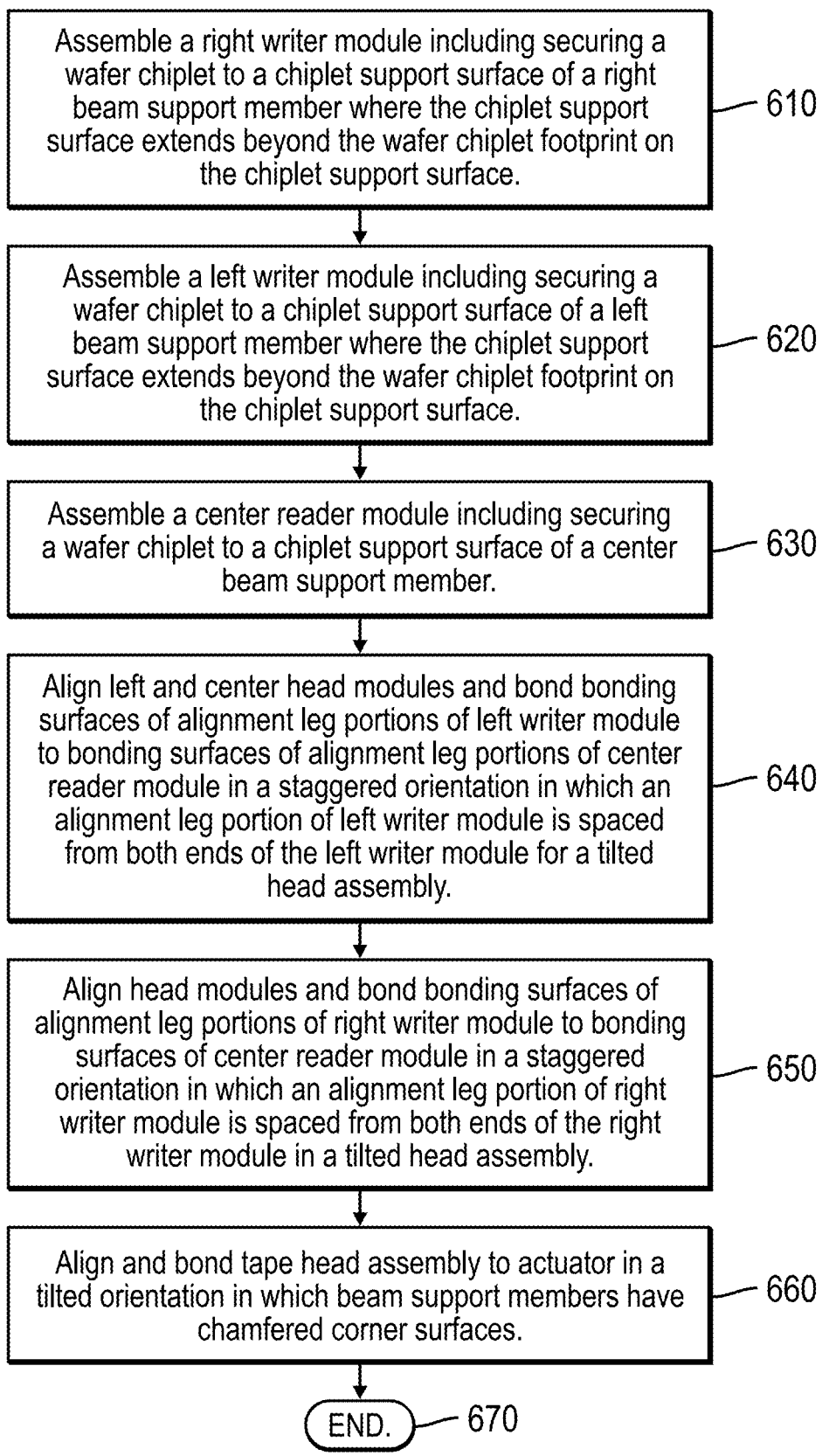
FIG. 6 depicts one embodiment of operations for assembling and mounting the tape head assembly of FIG. 2, in accordance with one embodiment of the present disclosure.

FIG. 6 depicts one embodiment of operations for fabricating a tilted tape head assembly in accordance with the present description, for a tape drive for data storage on magnetic tape. As shown in FIG. 6, the tilted tape head fabrication and installation operations in this example are represented by blocks 610-670 of FIG. 6. It is appreciated that the number and types of operations for fabricating and installing a tilted tape head in accordance with embodiments of the present description, may vary, depending upon the particular application. Furthermore, operations may be performed in sequences other than those depicted in FIG. 6. For example, operations for assembling the left and right writer modules may be performed in reverse order or substantially in parallel, depending upon the particular application.

In this embodiment, a right writer module is assembled (block 610, FIG. 6) by aligning and bonding a wafer chiplet to a chiplet support surface of a right beam support member in which the chiplet support surface extends beyond the wafer chiplet footprint on the chiplet support surface. In addition, a left writer module is assembled (block 620, FIG. 6) by aligning and bonding a wafer chiplet to a chiplet support surface of a left beam support member in which the chiplet support surface extends beyond the wafer chiplet footprint on the chiplet support surface.

Techniques for aligning a wafer chiplet to a beam support member and bonding the wafer chiplet to the beam support member in the aligned position are well known. Such techniques modified as appropriate for beam support members in accordance with the present description, may be utilized for assembling the wafer chiplets and beam supports member of the modules described herein. For example, known tools modified as appropriate, may be utilized to grasp the wafer chiplet and to grasp the beam support member and manipulate them in various degrees of freedom to achieve alignment and bonding. Such degrees of freedom may include six degrees of freedom such as three degrees of translational freedom in an x, y, z coordinate system, for example, and include three degrees of rotational freedom such as yaw, pitch and roll. The wafer chiplet and beam support member may be precisely manipulated to achieve a high degree of precision. In one embodiment, they may be aligned and bonded together within a translational tolerance on the order of sub-microns, for example, of positioning in each of the translational axes, and within a rotational tolerance on the order of a fraction of a degree, such as one tenth of a degree, for example, in each rotational degree of freedom. In addition to known assembly techniques, it is appreciated that assembly techniques which may yet be developed may be utilized as such techniques become available.

FIG. 3A depicts one embodiment of the wafer chiplet 220*r* being aligned and bonded to the top surface 310*r* of the beam support member 218*r* of the right writer module 212*r*. As noted above, the wafer chiplet 220*r* has servo and writer transducers, and is represented in FIG. 3B in simplified form as a dotted line footprint 315*r* of the wafer chiplet 220*r*. The wafer chiplet as represented by the footprint 315*r*, has been aligned with and bonded to the top surface 310*r* of the beam support member 218*r* as described above in connection with module 212*r* in FIG. 3A. Similarly, the wafer chiplet 220*l* of the left writer module 212*l* is represented in FIG. 3C in simplified form as a dotted line footprint 315*l*. The wafer chiplet 220*l* as represented by the dotted line footprint 315*l*, has been aligned with and bonded to the top surface 310*l* of the beam support member 218*l* of the left writer module 212*l* in a manner similar to that described above in connection with the right writer module 212*r* in FIG. 3A.

As previously mentioned, in one embodiment, the wafer chiplet support surface 310*l* of the left beam support member 218*l* of the left writer module 212*l* has a portion 552*l* (FIG. 3C) at the top end 458*t* which extends a distance E beyond the wafer chiplet footprint 315*l* disposed on the wafer chiplet support surface 310*l*. Similarly, the wafer chiplet support surface 310*r* (FIG. 3A) of the right beam support member 218*r* of the right writer module 212*r* has a portion 552*r* at the bottom end 468*b* which extends a distance E beyond the wafer chiplet footprint 315*r* (FIG. 3B) disposed on the wafer chiplet support surface 310*r*. Such lengthening of each writer beam support member at one end fully accommodates the wafer chiplet disposed on that beam support member such that in one embodiment, the wafer chiplet is always supported by the underlying beam support member over the entire footprint of the wafer chiplet. Thus, the wafer chiplet footprint 315*l*, 315*r* of each writer chiplet 220*l*, 220*r*, respectively is positioned wholly within the boundary of the chiplet support surface of the underlying writer beam support member so that the overlying wafer chiplet is more fully supported over its entire footprint by the underlying wafer support surface.

In addition to assembly (block 610, FIG. 6) of the wafer chiplet and beam support for the right writer module, and the assembly (block 620, FIG. 6) of the wafer chiplet and beam support for the left writer module, the wafer chiplet and beam support member of a center reader module is assembled (block 630, FIG. 6). In one embodiment, the center reader module may be a known center module and may be assembled using known wafer chiplet to beam support alignment and bonding techniques. It is appreciated that a tilted tape head assembly in accordance with the present description may also utilize reader modules that may be subsequently developed.

Following the assembly of each of the modules, the left writer module and the center reader module are aligned (block 640, FIG. 6) and bonded together. In one embodiment, the left writer and center reader modules are aligned by aligning the transducer elements and air/tape bearing surfaces of the left writer module and the center reader module. In one embodiment, bonding surfaces of the alignment leg portions of the left writer module are aligned (block 640, FIG. 6) to bonding surfaces of alignment leg portions of the center reader module in a staggered orientation in which an alignment leg portion of the left writer module is spaced from both ends of the left writer module for a tilted head assembly. Techniques for aligning and bonding together beam support members of modules for a tape head assembly in an aligned position are well known. Such techniques modified as appropriate for the modules described herein, may be utilized for assembling the modules described herein.

For example, known tools modified as appropriate, may be utilized to grasp the beam support member of one module and to grasp the beam support member of another module and manipulate them in various degrees of freedom to achieve alignment for bonding. Here too, such degrees of freedom may include six degrees of freedom such as three degrees of translational freedom in an x, y, z coordinate system, for example, and include three degrees of rotational freedom such as yaw, pitch and roll. The beam support members of the modules may be precisely manipulated to achieve a high degree of precision such that they may be aligned and bonded together within a translational tolerance on the order of sub-microns, for example, of positioning in each of the translational axes, and within a rotational tolerance on the order of a fraction of a degree, such as one tenth of a degree, for example, in each rotational degree of freedom. Such known grasping and alignment techniques may be modified as appropriate to accommodate the beam support members of the present description. In addition to known assembly techniques, it is appreciated that assembly techniques which may yet be developed may be utilized as such techniques become available.

Figure 3D:
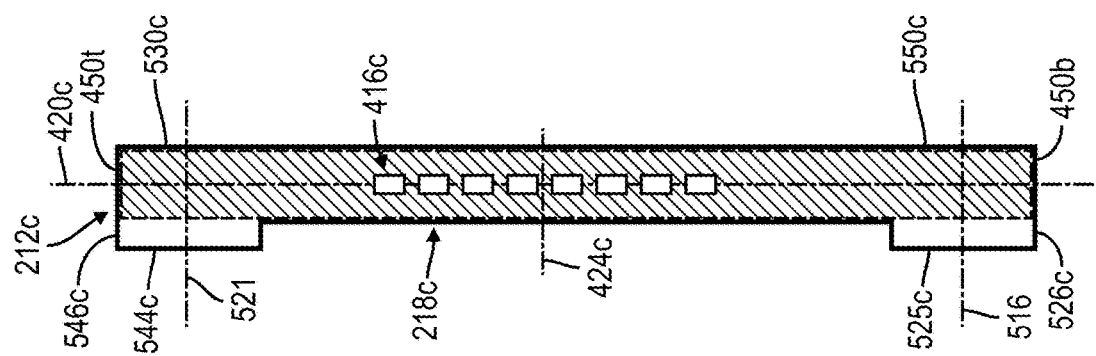
FIG. 3D is a top schematic view of one embodiment of a center reader module for the tape head assembly of FIG. 2, in accordance with one embodiment of the present disclosure.
Figure 3C:
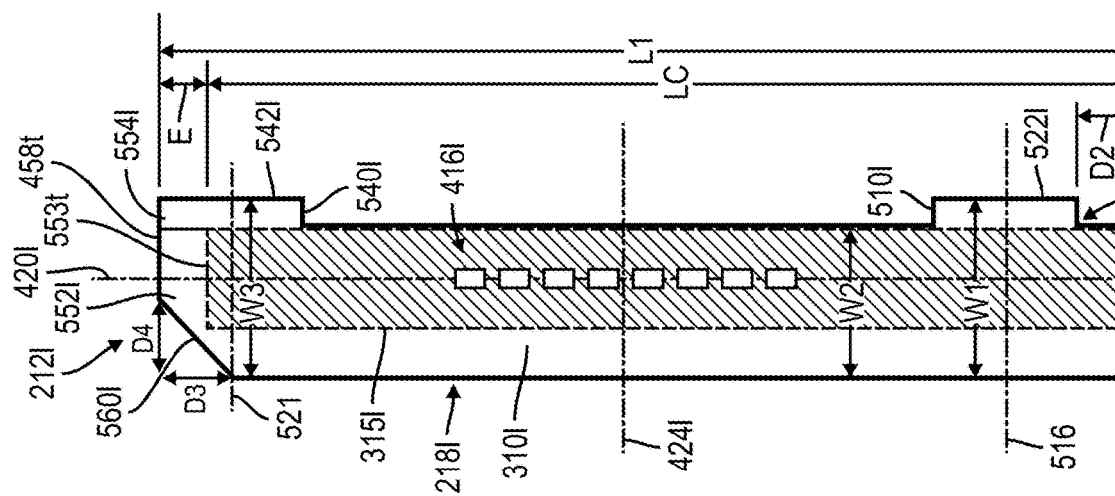
FIG. 3C is a top schematic view of one embodiment of the left writer module for the tape head assembly of FIG. 2, in accordance with one embodiment of the present disclosure.
Figure 7A:
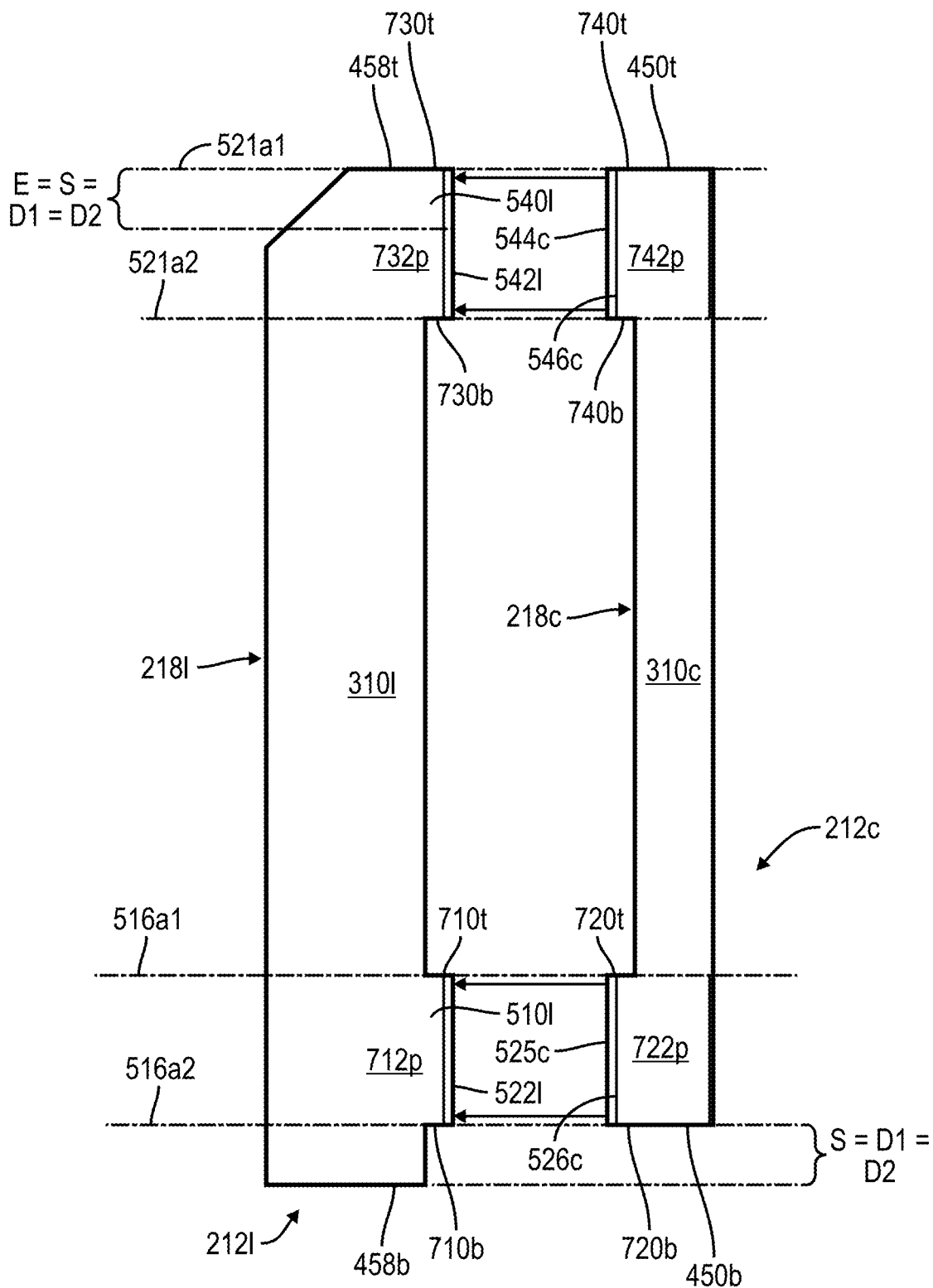
FIGS. 7A-7C depict one embodiment for aligning and bonding together, beam support members of a left writer module and a center reader module in a staggered orientation of the tape head assembly of FIG. 2, in accordance with one embodiment of the present disclosure.
Figure 7B:
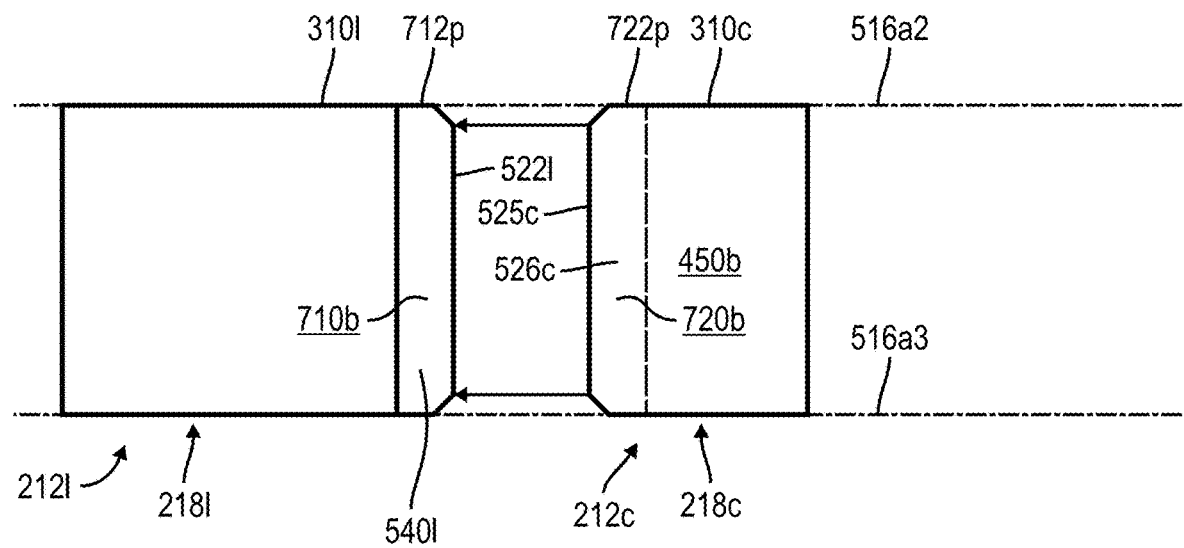
Figure 7C:
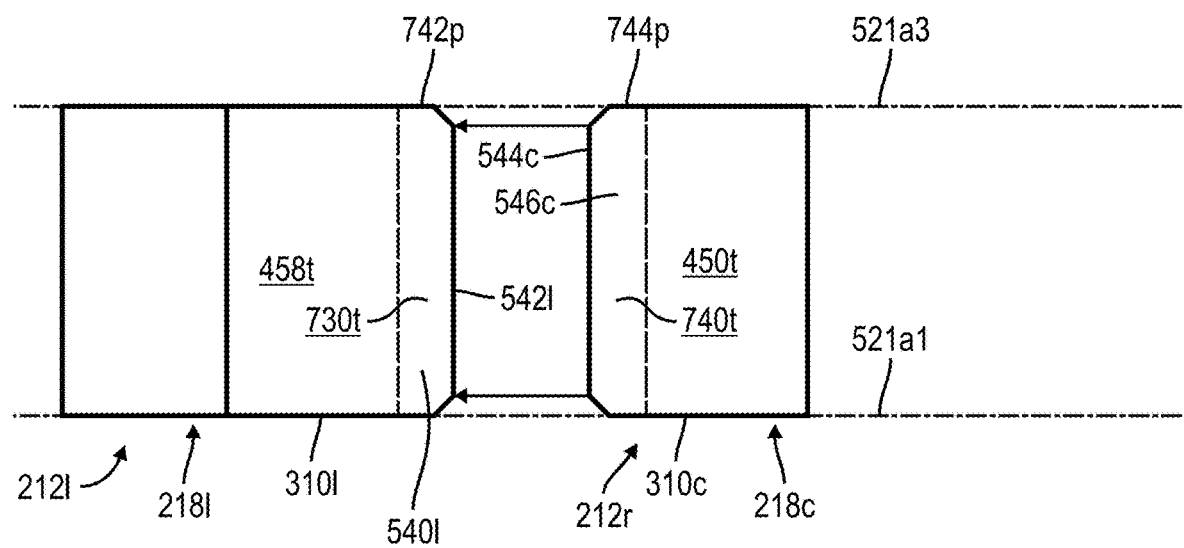

FIGS. 7A, 7B, 7C are schematic plan, bottom end, and top end views, respectively, depicting an example of the left beam support member 218*l* of the left writer module 212*l* (FIGS. 2, 3C) being aligned for bonding with the center beam support member 218*c* of the center reader module 212*c* (FIGS. 2, 3D). The wafer chiplets of the modules 212*l*, 212*c* (FIG. 2) have been omitted for purposes of clarity.

As noted above, in one embodiment, the reader elements of the center array 416*c* (FIGS. 4A, 4C) are aligned to the respective writer elements of the left and right arrays 416*l*, 416*r*, respectively, as well as their air/tape bearing surfaces as depicted by the alignment axis 440 for example. In one embodiment, the bonding surface 522*l* of the bottom alignment leg portion 510*l* of the left beam support member 218*l* of the left writer module 212*l*, is aligned for bonding with a bonding surface 525*c* of a bottom alignment leg portion 526*c* of the center beam support member 218*c* of the center reader module 212*c* (FIG. 2) as indicated by alignment axes 516*a*1, 516*a*2 in FIG. 7A, and alignment axes 516*a*2, 516*a*3 in FIG. 7B. In this embodiment, the alignment leg portion 510*l* has a bottom alignment plane 710*b* which is orthogonal to the longitudinal axis 420*l* (FIG. 3C) and is also orthogonal to an alignment plane 712*p* which is parallel to the longitudinal axis 420*l*. Similarly, the alignment leg portion 526*c* has a bottom alignment plane 720*b* which is orthogonal to the longitudinal axis 420*c* (FIG. 3D) and is also orthogonal to an alignment plane 722*p* which is parallel to the longitudinal axis 420*c*.

Because the displacement D2 (FIG. 3C) between the alignment leg portion 510*l* and the proximal bottom end 458*b* of the beam support member 218*l*, matches the stagger displacement distance S, D1 (FIG. 4C) between the proximal bottom end 458*b* of the beam support member 218*l*, and the bottom end 450*b* of the center beam support member 218*c* of the center reader module 212*c*, the bottom alignment planes 710*b*, 720*b* (FIGS. 7A, 7B) of the alignment leg portions 510*l*, 526*c*, respectively are coplanar when both aligned with the common alignment axes 516*a*2, 516*a*3. In addition, alignment planes 712*p*, 722*p* of the alignment leg portions 510*l*, 526*c*, respectively, are coplanar when both aligned with the common alignment axes 516*a*1, 516*a*2. The common alignment axes 516*a*1, 516*a*2, 516*a*3 facilitate alignment of the alignment leg portions 510*l*, 526*c* and hence the bonding surfaces 522*l*, 525*c* for bonding.

Similarly, the bonding surface 542*l* of the top alignment leg portion 540*l* of the left beam support member 218*l* of the left writer module 212*l*, is aligned for bonding with a bonding surface 544*c* of a top alignment leg portion 546*c* of the center beam support member 218*c* of the center reader module 212*c* (FIG. 2) as indicated by alignment axes 521*a*1, 521*a*2 in FIG. 7A, and alignment axes 521*a*1, 521*a*3 in FIG. 7C. In this embodiment, the alignment leg portion 540*l* has a top alignment plane 730*t* which is orthogonal to the longitudinal axis 420*r* (FIG. 3B), and is also orthogonal to an alignment plane 732*p* which is parallel to the longitudinal axis 420*r*. Similarly, the alignment leg portion 546*c* has an alignment plane 740*t* which is orthogonal to the longitudinal axis 420*c* (FIG. 3D), and is also orthogonal to an alignment plane 742*p* which is parallel to the longitudinal axis 420*c*.

Because the extension length E (FIG. 3C) of the extension portion 552*l* matches the stagger displacement distance S, D1 (FIG. 4C), the top alignment planes 730*t*, 740*t* (FIGS. 7A, 7C) of the alignment leg portions 540*l*, 546*c*, respectively, are coplanar when both aligned with the common alignment axes 521*a*2, 521*a*3. In addition, alignment planes 732*p*, 742*p* of the alignment leg portions 540*l*, 546*c*, respectively, are coplanar when both aligned with the common alignment axes 521*a*1, 521*a*2. The common alignment axes 521*a*1, 521*a*2, 521*a*3 facilitate alignment of the bonding surfaces 522*l*, 525*c* for bonding.

In the illustrated embodiment, once aligned, a suitable adhesive is applied to the bonding surfaces 522*l*, 525*c*, 542*l*, 544*c*. The bonding surfaces 522*l* and 525*c* are compressed together and the bonding surfaces 542*l* and 544*c* are compressed together, maintaining their alignment as described above. In one embodiment, the adhesive applied to the bonding surfaces is cured by applying a suitable curing agent such as ultraviolet light to cure the adhesive bonds between these bonding surfaces of the beam support members 218*l*, 218*c*.

Spacing the bottom alignment leg portion 510*l* from the bottom end 458*b* of the beam support member 218*l* of the left writer module 212*l*, facilitates aligning and bonding the bonding surface 522*l* of the beam support member 218*l* to the bottom bonding surface 525*c* of the center beam support member 218*c* in a staggered orientation as described above. Thus the bonding surface 522*l* of the beam support member 218*l* may be readily aligned and bonded to the bottom bonding surface 525*c* of the center beam support member 218*c* as indicated by alignment axes 516*a*1, 516*a*2 in FIG. 7A, and alignment axes 521*a*2, 521*a*3 in FIG. 7B.

Moreover, the bonding surface 522*l* of the beam support member 218*l* may be fully registered with the bottom bonding surface 525*c* of the center beam support member 218*c* over its entire length between the alignment axes 516*a*1, 516*a*2 (FIG. 7A). It has been found that such alignment and registration between the bonding surface 522*l* of the beam support member 218*l* and the bottom bonding surface 525*c* of the center beam support member 218*c* reduces shifting of staggered modules out of alignment in all six degrees of freedom of potential movement over time such as over the course of the bonding process including both during and after curing of adhesive bonds.

Figure 7D:
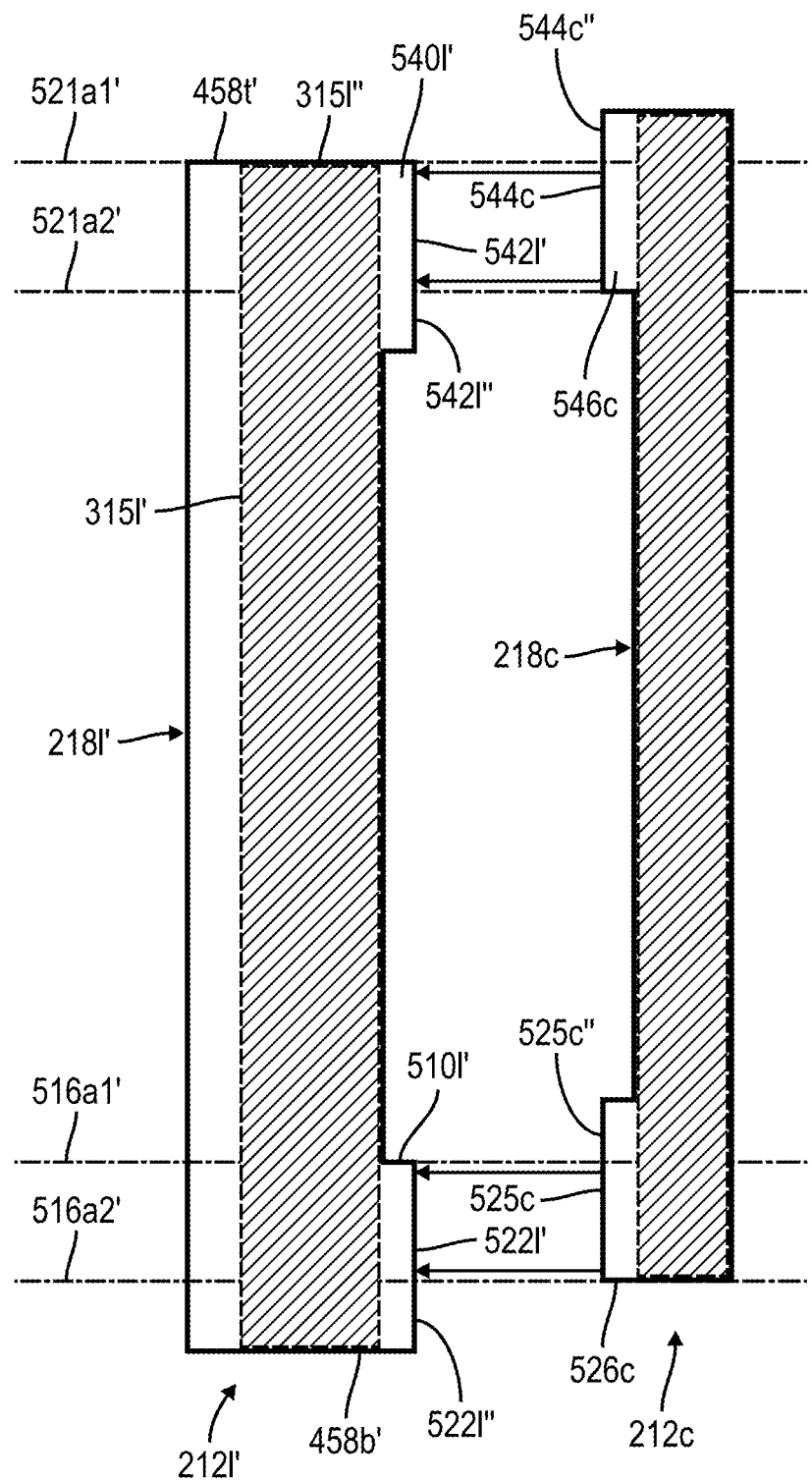
FIG. 7D depicts another embodiment for aligning and bonding beam support members of a left writer module and a center reader module in a staggered orientation.

By comparison, FIG. 7D depicts an alternative embodiment in which the bottom alignment leg portion 510*l'* is not spaced from the bottom end 458*b'* but is instead positioned at the bottom end 458*b'*. As shown in FIG. 7D, the bonding surface 522*l'* of the beam support member 218*l'* is not fully registered with respect to the bottom bonding surface 525*c* of the center beam support member 218*c* in a staggered orientation as indicated by alignment axes 516*a*1', 516*a*2' in FIG. 7D.

For example, FIG. 7D shows that the bonding surface 522*l'* (FIG. 7D) of the alternate embodiment beam support member 218*l'* is misregistered with the bottom bonding surface 525*c* of the center beam support member 218*c* outside the alignment axes 516*a*1', 516*a*2' (FIG. 7A). More specifically, a portion 522*l'''* of the bonding surface 522*l'* does not make contact with the bonding surface 525*c*, and a portion 525*c''* of the bonding surface 525*c* does not make contact with the bonding surface 522*l'* when the bonding surfaces 522*l'*, 525*c* are compressed together. As a result, the effective bonding areas of the bonding surfaces 522*l'*, 525*c* are reduced by the sizes of the portions 522*l'''*, 525*c''*, respectively. Furthermore, it is believed that side overflow of adhesive in the vicinity of the surface portions 522*l'''*, 525*c''* which remain exposed following bonding, can prevent the adhesive bond from curing properly. It has been found that such misregistration between the bonding surface 522*l'* of the left beam support member 218*l'* and the bottom bonding surface 525*c* of the center beam support member 218*c* can as a result, lead to shifting of staggered modules out of alignment in one or more of the six degrees of freedom of potential movement during or after curing of adhesive bonds.

In another aspect of a tilted tape head in accordance with the present description, extending the top alignment leg portion 540*l* beyond the top end of the wafer chiplet footprint 315*l* (FIG. 3C) of the left writer module 212*l*, facilitates aligning and bonding the bonding surface 542*l* of the left beam support member 218*l* to the top bonding surface 544*c* of the center beam support member 218*c* in a staggered orientation as described above. Thus the bonding surface 542*l* of the beam support member 218*l* may be readily aligned and bonded to the top bonding surface 544*c* of the center beam support member 218*c* as indicated by alignment axes 521*a*1, 521*a*2 in FIG. 7A, and alignment axes 521*a*1, 521*a*3 in FIG. 7C.

Moreover, the bonding surface 542*l* of the left beam support member 218*l* may be fully registered with the top bonding surface 544*c* of the center beam support member 218*c* over its entire length between the alignment axes 521*a*1, 521*a*2 (FIG. 7A) and over its entire height between the alignment axes 521*a*1, 521*a*3 (FIG. 7C). It has been found that such alignment and registration between the bonding surface 542*l* of the left beam support member 218*l* and the top bonding surface 544*c* of the center beam support member 218*c* reduces shifting of staggered modules out of alignment in all six degrees of freedom of potential movement over time such as over the course of the bonding process including both during and after curing of adhesive bonds.

By comparison, FIG. 7D depicts an alternative embodiment in which the top end 458*t'* of the alignment leg portion 540*l'* does not extend beyond the top end 315*l'''* of the wafer chiplet footprint 315*l'* but is instead positioned even with the top end 315*l'''* of the wafer chiplet footprint 315*l'*. As shown in FIG. 7D, the bonding surface 542*l'* of the left beam support member 218*l'* is not fully registered with respect to the top bonding surface 544*c* of the center beam support member 218*c* in a staggered orientation as indicated by alignment axes 521*a*1', 521*a*2' in FIG. 7D.

For example, FIG. 7D shows that the bonding surface 542*l'* (FIG. 7D) of the alternate embodiment beam support member 218*l'* is misregistered with the top bonding surface 544*c* of the center beam support member 218*c* outside the alignment axes 521*a*1', 521*a*2' (FIG. 7A). More specifically, a portion 542*l'''* of the bonding surface 542*l'* does not make contact with the bonding surface 545*c*, and a portion 544*c''* of the bonding surface 544*c* does not make contact with the bonding surface 542*l'* when the bonding surfaces 542*l'*, 544*c* are compressed together. It has been found that such misregistration between the bonding surface 542*l'* of the left beam support member 218*l'* and the top bonding surface 544*c* of the center beam support member 218*c* can lead to shifting of staggered modules out of alignment in one or more of the six degrees of freedom of potential movement during or after curing of adhesive bonds.

Figure 8A:
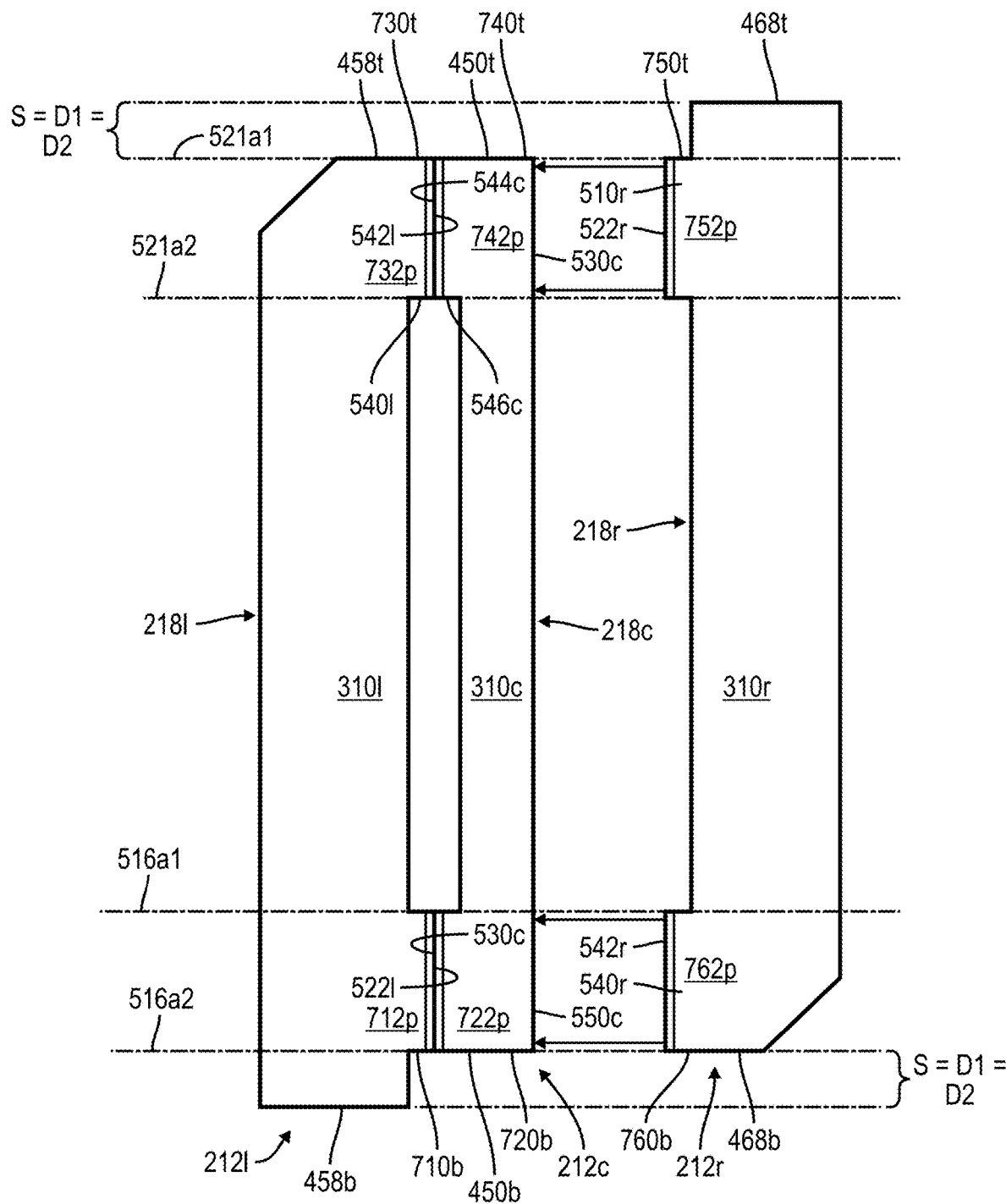
FIGS. 8A-8C depict one embodiment for aligning and bonding together, beam support members of a right writer module and a center reader module in a staggered orientation of the tape head assembly of FIG. 2, in accordance with one embodiment of the present disclosure.
Figure 8B:
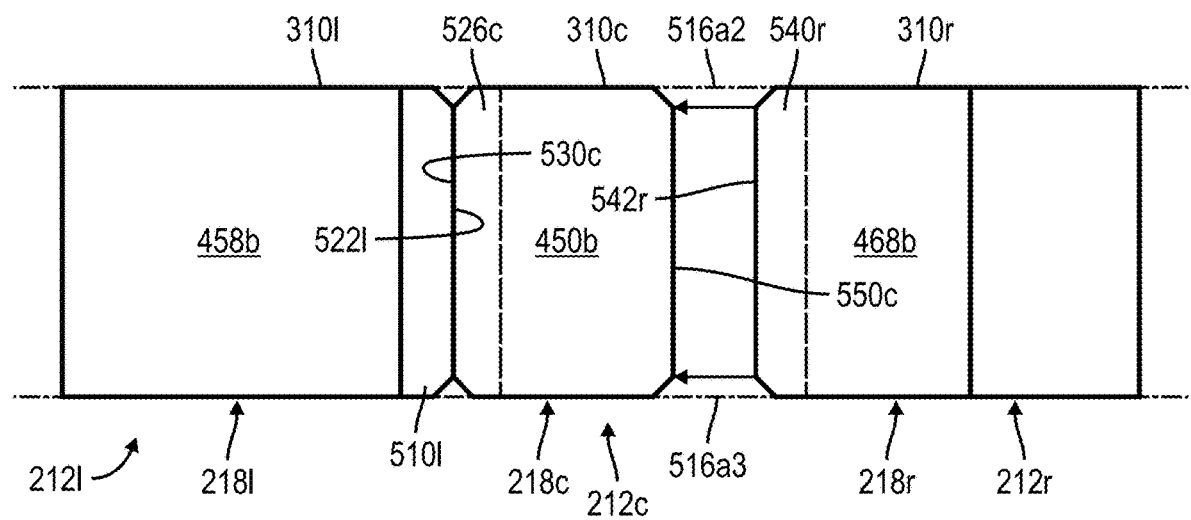
Figure 8C:
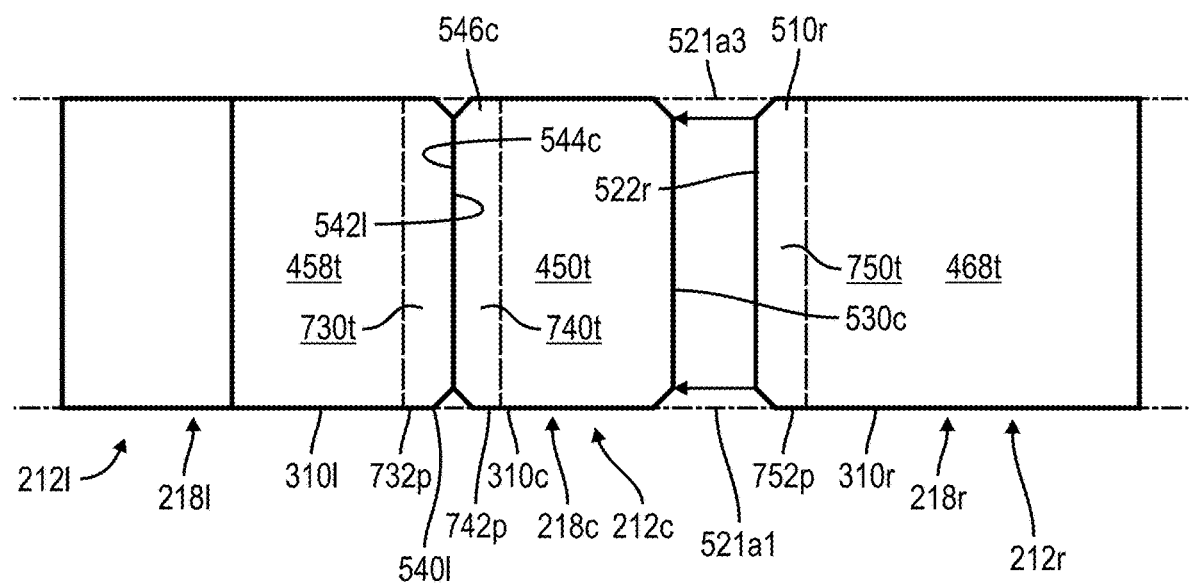

Following the assembly of the left and center modules 212*l*, 212*c* as described above, the right writer module and the assembly of the center reader module and left writer module are aligned (block 650, FIG. 6) and bonded together. In one embodiment, the right writer module and the assembly of the center reader module and left writer module are aligned by aligning the transducer elements and air/tape bearing surfaces of the right writer module, center reader module and left writer module. In one embodiment, bonding surfaces of the alignment leg portions of the right writer module 212*r* are aligned (block 650, FIG. 6) to bonding surfaces of the center reader module in a staggered orientation in which an alignment leg portion of the right writer module is spaced from both ends of the right writer module for a tilted head assembly. FIGS. 8A, 8B, 8C are schematic plan, bottom end and top end views, respectively, depicting the left beam support member 218*l* and the center beam support member 218*c* aligned and bonded together as described above. FIGS. 8A, 8B, 8C further depict an example of the right beam support member 218*r* of the right writer module 212*r* (FIGS. 2, 3A, 3B) being aligned for bonding with the beam support member 218*c* of the center reader module 212*c* (FIGS. 2, 3D) which has previously been bonded to the left beam support member of the left writer module as described above. The wafer chiplets of the modules 212*l*, 212*c*, 212*r* have been omitted for purposes of clarity.

As noted above, in one embodiment, the reader elements of the center array 416*c* (FIGS. 4A, 4C) are aligned to the respective writer elements of the left and right arrays 416*l*, 416*r*, respectively, as well as their air/tape bearing surfaces as depicted by the alignment axis 440 for example. In one embodiment, the bottom bonding surface 542*r* of the bottom alignment leg portion 540*r* of the right beam support member 218*r* of the right writer module 212*r*, is aligned for bonding with a bottom bonding surface 550*c* of the center beam support member 218*c* of the center reader module 212*c* (FIG. 2) as indicated by alignment axes 516*a*1, 516*a*2 in FIG. 8A, and alignment axes 516*a*2, 516*a*3 in FIG. 8B. Similarly, the top bonding surface 522*r* of the top alignment leg portion 510*r* of the right beam support member 218*r* of the right writer module 212*r* (FIG. 2), is aligned for bonding with a bonding surface 530*c* of the center beam support member 218*c* of the center reader module 212*c* (FIG. 2) as indicated by alignment axes 521a1, 521a2 (FIG. 8A), and alignment axes 521a1, 521a3 (FIG. 8C).

Here too, once aligned, a suitable adhesive is applied to the bonding surfaces 542r, 550c, 522r, 530c. The bonding surfaces 542r and 550c are compressed together and the bonding surfaces 522r and 530c are compressed together, maintaining their alignment as described above. Again, the adhesive may be cured by applying a suitable curing agent such as ultraviolet light to cure the adhesive bonds between these bonding surfaces of the beam support members 218r, 218c.

In a manner similar to that described above for the bottom alignment leg portion 510l of the left beam support member 218l, spacing the top alignment leg portion 510r from the top end 458t of the right beam support member 218r of the right writer module 212r, facilitates aligning and bonding the bonding surface 522r of the right beam support member 218r to the top bonding surface 530c of the center beam support member 218c in a staggered orientation. Thus the bonding surface 522r of the beam support member 218r may be readily aligned and bonded to the top bonding surface 530c of the center beam support member 218c as indicated by alignment axes 521a1, 521a2 in FIG. 8A, and alignment axes 521a1, 521a3 in FIG. 8C.

It is appreciated that aligning and bonding the bonding surface 522r of the right beam support member 218r to the top bonding surface 530c of the center beam support member 218c, and also aligning and bonding the bonding surface 542l (FIGS. 7A, 7C, 8A, 8C) of the left beam support member 218l to the top bonding surface 544c of the center beam support member 218c, are indicated by common sets of alignment axes 521a1, 521a2 in FIGS. 7A, 8A, and alignment axes 521a1, 521a3 in FIGS. 7C, 8C. As a result, aligning and bonding of bonding surfaces of both the left and right support members 218l, 218r, respectively, and the center support member 218c, is facilitated by such alignment axes common to both the left and right support members and the center support member.

More specifically, in this embodiment, the alignment leg portion 510r has a top alignment plane 750t which is orthogonal to the longitudinal axis 420r (FIG. 3B) and is also orthogonal to an alignment plane 752p which is parallel to the longitudinal axis 420l. Similarly, the alignment leg portion 526c has a top alignment plane 740t which is orthogonal to the longitudinal axis 420c (FIG. 3D) and is also orthogonal to an alignment plane 742p which is parallel to the longitudinal axis 420c, as noted above.

Because the displacement D2 (FIG. 3C) between the alignment leg portion 510r and the proximal top end 468t of the beam support member 218r, matches the stagger displacement distance S, D1 (FIG. 4C) between the proximal top end 468t of the beam support member 218r, and the top end 450t of the center beam support member 218c of the center reader module 212c, the top alignment planes 730t, 740t, 750t (FIGS. 8A, 8C) of the alignment leg portions 540l, 546c, 510r respectively, are coplanar when aligned with the common alignment axes 521a1, 521a3. In addition, alignment planes 732p, 742p, 752p of the alignment leg portions 540l, 546c, 510r respectively, are coplanar when aligned with the common alignment axes 521a1, 521a2. The common alignment axes 521a1, 521a2, 521a3 facilitate alignment of the alignment leg portions 540l, 546c, 510r and hence the bonding surfaces 522r, 530c for bonding.

Moreover, the bonding surface 522r of the right beam support member 218r may be fully registered with the top bonding surface 530c of the center beam support member 218c over its entire length between the alignment axes 521a1, 521a2 (FIG. 8A). It has been found that such alignment and registration between the bonding surface 522r of the beam support member 218r and the top bonding surface 530c of the center beam support member 218c reduces shifting of staggered modules out of alignment in all six degrees of freedom of potential movement over time such as over the course of the bonding process including both during and after curing of adhesive bonds.

In this manner, the alignment leg of one module is matched with the alignment leg of another module in a staggered orientation. It has been found that such matching alignment maximizes glue adhesion between the legs and minimizes positional drifting of the modules after glue curing.

Figure 8D:
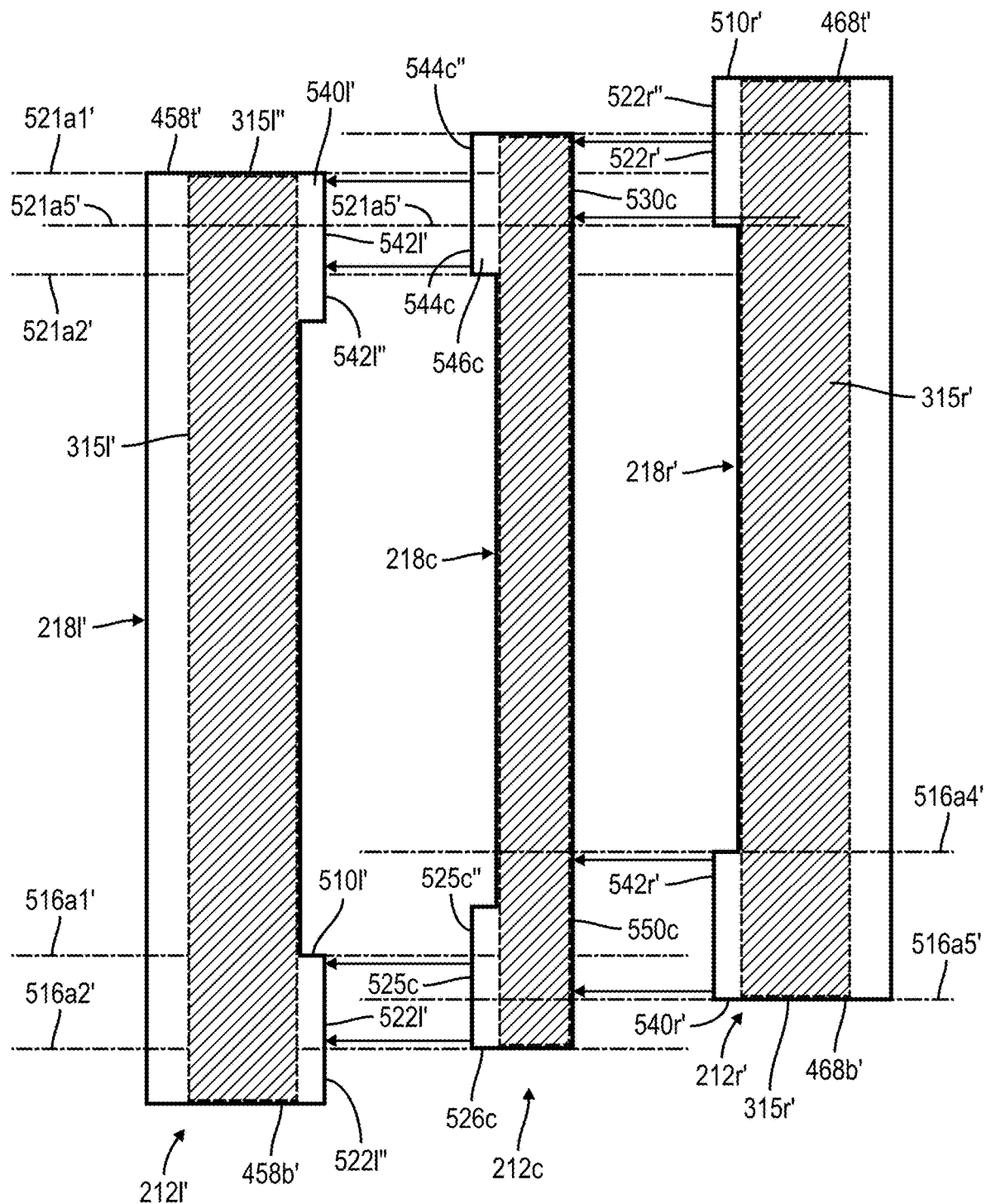
FIG. 8D depicts another embodiment for aligning and bonding beam support members of a right writer module and a center reader module in a staggered orientation.

By comparison, FIG. 8D depicts an alternative embodiment in which the top alignment leg portion 510r' is not spaced from the top end 468t' of the right beam support member 218r' but is instead positioned at the top end 468t'. As shown in FIG. 8D, the bonding surface 522r' of the right beam support member 218r' is not fully registered with respect to the top bonding surface 530c of the center beam support member 218c in a staggered orientation as indicated by alignment axes 521a4', 521a5' in FIG. 8D.

For example, FIG. 8D shows that the bonding surface 522r' (FIG. 8D) of the alternate embodiment beam support member 218r' is misregistered with the top bonding surface 530c of the center beam support member 218c outside the alignment axis 521a4'. More specifically, a portion 522r''' of the bonding surface 522r' does not make contact with the bonding surface 530c when compressed together. As noted above, it has been found that such misregistration between the bonding surface 522r' of the right beam support member 218r' and the top bonding surface 530c of the center beam support member 218c can lead to shifting of staggered modules out of alignment in one or more of the six degrees of freedom of potential movement during or after curing of adhesive bonds.

Moreover, it is appreciated in this alternative embodiment of FIG. 8D, that aligning and bonding the bonding surface 522r' of the right beam support member 218r' to the top bonding surface 530c of the center beam support member 218c as indicated by alignment axes 521a4', 521a5', and also aligning and bonding the bonding surface 542l' of the left beam support member 218l' to the top bonding surface 544c of the center beam support member 218c as indicated by alignment axes 521a1', 521a2', are not indicated by common sets of alignment axes. Instead, the alignment axes 521a1', 521a2' are different from the alignment axes 521a4', 521a5'. As a result, aligning and bonding of bonding surfaces of both the left and right support members 218l, 218r, respectively, and the center support member 218c, is more difficult by the lack of such alignment axes common to both the left and right support members and the center support member.

In a manner similar to that described above for the top alignment leg portion 540l of the left beam support member 218l, extending the bottom alignment leg portion 540r beyond the bottom end of the wafer chiplet footprint 315r (FIG. 3B) of the right writer module 212r, facilitates aligning and bonding the bonding surface 542r of the right beam support member 218r to the bottom bonding surface 550c of the center beam support member 218c in a staggered orientation. Thus the bonding surface 542r of the right beam support member 218r may be readily aligned and bonded to the top bonding surface 544c of the center beam support member 218c as indicated by alignment axes 516a1, 516a2 in FIG. 8A, and alignment axes 521a2, 516a3 in FIG. 8B.

It is appreciated that aligning and bonding the bonding surface 542r of the right beam support member 218r to the bottom bonding surface 550c of the center beam support member 218c, and also aligning and bonding the bonding surface 522l of the left beam support member 218l to the bottom bonding surface 530c of the center beam support member 218c, are indicated by common sets of alignment axes 516a1, 516a2 in FIGS. 7A, 8A, and alignment axes 516a2, 516a3 in FIGS. 7B, 8B. As a result, aligning and bonding of bonding surfaces of both the left and right support members 218l, 218r, respectively, and the center support member 218c, is facilitated by such alignment axes common to both the left and right support members and the center support member.

In this embodiment, the alignment leg portion 540r has a bottom alignment plane 760b which is orthogonal to the longitudinal axis 420r (FIG. 3B), and is also orthogonal to an alignment plane 762p which is parallel to the longitudinal axis 420r. Similarly, the alignment leg portion 526c has an alignment plane 720b which is orthogonal to the longitudinal axis 420c (FIG. 3D), and is also orthogonal to an alignment plane 722p which is parallel to the longitudinal axis 420c, as described above.

Because the extension length E (FIG. 3B) of the extension portion 552r matches the stagger displacement distance S, D1 (FIG. 4C), the bottom alignment planes 710bt, 7420b, 760b of the alignment leg portions 540l, 546c, 540r, respectively, are coplanar when both aligned with the common alignment axes 521a2, 521a3. In addition, alignment planes 712p, 722p, 762p of the alignment leg portions 540l, 546c, 540r, respectively, are coplanar when both aligned with the common alignment axes 521a1, 521a2. The common alignment axes 521a1, 521a2, 521a3 facilitate alignment of the bonding surfaces 542r, 550c for bonding.

By comparison, FIG. 8D depicts an alternative embodiment in which the bottom end 468b' of the bottom alignment leg portion 540r' does not extend beyond the bottom end 315r''' of the wafer chiplet footprint 315r' but is instead positioned even with the bottom end 315r''' of the wafer chiplet footprint 315r'. It is appreciated in the alternative embodiment of FIG. 8D, that aligning and bonding the bonding surface 542r' of the right beam support member 218r' to the bottom bonding surface 550c of the center beam support member 218c as indicated by alignment axes 516a4', 516a5', and also aligning and bonding the bonding surface 522l' of the left beam support member 218l' to the bottom bonding surface 525c of the center beam support member 218c as indicated by alignment axes 516a1', 516a2', are not indicated by common sets of alignment axes. Instead, the alignment axes 516a1', 516a2 are different from the alignment axes 516a4', 516a5'. As a result, aligning and bonding of bonding surfaces of both the left and right support members 218l, 218r, respectively, and the center support member 218c, is more difficult by the lack of such alignment axes common to both the left and right support members and the center support member.

Following the assembly of the left writer, center reader and right writer modules 212l, 212c, 212r, respectively, to form the tilted tape head assembly 210 as described above in connection with the embodiment of FIGS. 7A-7C and 8A-8C, the tape head assembly 210 is mounted (block 660, FIG. 6) in the actuator 132 of the tape drive 100 (FIG. 1) as schematically represented in FIGS. 4A-4D. Techniques for aligning and bonding a tape head assembly within an actuator in an aligned position are well known and may be utilized for mounting the tape head assembly 210 described herein. Known tools modified as appropriate to accommodate the tape head assembly 210 of the present description, may be utilized to grasp the tape head assembly 210 and manipulate it in various degrees of freedom to achieve alignment and bonding to the actuator 132.

Here too, such degrees of freedom may include six degrees of freedom such as three degrees of translational freedom in an x, y, z coordinate system, for example, and may include three degrees of rotational freedom such as yaw, pitch and roll. The tape head assembly translational and rotational positions may be precisely manipulated to achieve a high degree of precision. For example, the tape head assembly 210 may be aligned and bonded to the actuator 132 within a translational tolerance on the order of sub-microns, for example, of positioning in each of the translational axes, and within a rotational tolerance on the order of a fraction of a degree, such as one tenth of a degree, for example, in each rotational degree of freedom. In addition to known assembly techniques, it is appreciated that assembly techniques which may yet be developed may be utilized as such techniques become available.

As discussed above in connection with FIG. 4D, one end of a beam support member of a tape head module such as a writer module, may be chamfered so as to reduce the overall length of a tilted tape head in a staggered orientation. As a result, mounting of the tilted head assembly 210 into the actuator 132 of the tape drive, is facilitated as depicted in FIG. 4D. In one embodiment, the head assembly 210 is tilted at a nominal angle of approximately 7 degrees. However, in FIG. 4D, the tilt angle of the tilted head assembly 210 is exaggerated for purposes of clarity. In addition, alignment legs may be chamfered adjacent bonding surfaces as best seen in FIGS. 7B, 7C, 8B, 8C in one embodiment.

The controller 128 and the computer 140 of FIG. 1 are described as performing various logic functions. In one embodiment, the controller 128 and the computer 140 includes processors which cause operations which perform the various logic functions. Alternatively, one or more of these logic functions may be performed by one or more of programmed centralized processors such as central processing units (CPUs) and programmed distributed processors such as integrated circuit logic devices such as Application Specific Integrated Circuit (ASIC) devices, for example. Programming of such hardware may be provided by one or more of software and firmware alone or in combination, and stored in a memory. In other embodiments, some or all of the logic functions of the controller 128 and computer 140 may be performed by dedicated or hard-wired logic circuitry.

One or more of the controller 128 and computer 140 may be implemented as program modes which may comprise routines, programs, objects, components, logic, data structures, and so on that perform particular tasks or implement particular abstract data types. The program components and hardware devices of the tape drive 100 of FIG. 1 may be implemented in one or more computer systems, where if they are implemented in multiple computer systems, then the computer systems may communicate over a network.

The present invention may be a system, device, a method, and/or a computer program product. The computer program product may include a computer readable storage medium (or media) having computer readable program instructions thereon for causing a processor to carry out aspects of the present invention.

Various aspects of the present disclosure are described by narrative text, flowcharts, block diagrams of computer systems and/or block diagrams of the machine logic included in computer program product (CPP) embodiments. With respect to any flowcharts, depending upon the technology involved, the operations can be performed in a different order than what is shown in a given flowchart. For example, again depending upon the technology involved, two operations shown in successive flowchart blocks may be performed in reverse order, as a single integrated step, concurrently, or in a manner at least partially overlapping in time.

A computer program product embodiment ("CPP embodiment" or "CPP") is a term used in the present disclosure to describe any set of one, or more, storage media (also called "mediums") collectively included in a set of one, or more, storage devices that collectively include machine readable code corresponding to instructions and/or data for performing computer operations specified in a given CPP claim. A "storage device" is any tangible device that can retain and store instructions for use by a computer processor. Without limitation, the computer readable storage medium may be an electronic storage medium, a magnetic storage medium, an optical storage medium, an electromagnetic storage medium, a semiconductor storage medium, a mechanical storage medium, or any suitable combination of the foregoing g. Some known types of storage devices that include these mediums include: diskette, hard disk, random access memory (RAM), read-only memory (ROM), erasable programmable read-only memory (EPROM or Flash memory), static random access memory (SRAM), compact disc read-only memory (CD-ROM), digital versatile disk (DVD), memory stick, floppy disk, mechanically encoded device (such as punch cards or pits/lands formed in a major surface of a disc) or any suitable combination of the foregoing. A computer readable storage medium, as that term is used in the present disclosure, is not to be construed as storage in the form of transitory signals per se, such as radio waves or other freely propagating electromagnetic waves, electromagnetic waves propagating through a waveguide, light pulses passing through a fiber optic cable, electrical signals communicated through a wire, and/or other transmission media. As will be understood by those of skill in the art, data is typically moved at some occasional points in time during normal operations of a storage device, such as during access, de-fragmentation or garbage collection, but this does not render the storage device as transitory because the data is not transitory while it is stored.

The letter designators, such as i, is used to designate a number of instances of an element may indicate a variable number of instances of that element when used with the same or different elements.

The terms "an embodiment", "embodiment", "embodiments", "the embodiment", "the embodiments", "one or more embodiments", "some embodiments", and "one embodiment" mean "one or more (but not all) embodiments of the present invention(s)" unless expressly specified otherwise.

The terms "including", "comprising", "having" and variations thereof mean "including but not limited to", unless expressly specified otherwise.

The enumerated listing of items does not imply that any or all of the items are mutually exclusive, unless expressly specified otherwise.

The terms "a", "an" and "the" mean "one or more", unless expressly specified otherwise.

Devices that are in communication with each other need not be in continuous communication with each other, unless expressly specified otherwise. In addition, devices that are in communication with each other may communicate directly or indirectly through one or more intermediaries.

A description of an embodiment with several components in communication with each other does not imply that all such components are required. On the contrary a variety of optional components are described to illustrate the wide variety of possible embodiments of the present invention.

When a single device or article is described herein, it will be readily apparent that more than one device/article (whether or not they cooperate) may be used in place of a single device/article. Similarly, where more than one device or article is described herein (whether or not they cooperate), it will be readily apparent that a single device/article may be used in place of the more than one device or article, or a different number of devices/articles may be used instead of the shown number of devices or programs. The functionality and/or the features of a device may be alternatively embodied by one or more other devices which are not explicitly described as having such functionality/features. Thus, other embodiments of the present invention need not include the device itself.

The foregoing description of various embodiments of the invention has been presented for the purposes of illustration and description. It is not intended to be exhaustive or to limit the invention to the precise form disclosed. Many modifications and variations are possible in light of the above teaching. It is intended that the scope of the invention be limited not by this detailed description, but rather by the claims appended hereto. The above specification, examples and data provide a complete description of the manufacture and use of the composition of the invention. Since many embodiments of the invention can be made without departing from the spirit and scope of the invention, the invention resides in the claims herein after appended.

What is claimed is:

1. A device for data storage on storage media, comprising:
   a head having:
      a first support member having a body portion wherein the body portion has a first end, a second end distal from the first end, a first longitudinal length extending longitudinally from the first end to the second end, and a first width transverse to the longitudinal length; and
      a first wafer chiplet disposed on the support member and having transducers formed in the chiplet and adapted to at least one of read data from and write data to media moving past the transducers; and
      wherein the first support member further has a first alignment leg portion projecting from the body portion so that the support member has a width at the first alignment leg portion exceeding the first width of the body portion, the first alignment leg portion having a bonding surface spaced from both the first and second ends of the body portion of the support member.

2. The device of claim 1 wherein the first support member further has a second alignment leg portion having a bonding surface and projecting from the body portion so that the support member has a width at the second alignment leg portion exceeding the first width of the body portion.

3. The device of claim 2 wherein the body portion has a chamfered edge at one end of the body portion.

4. The device of claim 1 wherein the head further has:
   a second support member having a body portion wherein the body portion of the second support member has a first end, a second end distal from the first end, a first length extending longitudinally from the first end to the second end, and a first width transverse to the longitudinal length; and
   a second wafer chiplet disposed on the second support member and having head transducers formed in the second wafer chiplet and adapted to at least one of read data from and write data to media moving past the transducer; and wherein the second support member further has a first alignment leg portion projecting from the body portion of the second support member and having a bonding surface aligned and bonded with the bonding surface of an alignment leg portion of the first support member, the second support member further having a second alignment leg portion projecting from the body portion of the second support member and having a bonding surface aligned and bonded with a bonding surface of another alignment leg portion of the first support member.

5. The device of claim 4 wherein the head further has:

a third support member having a body portion wherein the body portion of the third support member has a first end, a second end distal from the first end, a first length extending longitudinally from the first end to the second end, and a first width transverse to the longitudinal length; and a third wafer chiplet disposed on the third support member and having transducers formed in the third wafer chiplet and adapted to at least one of read data from and write data to media moving past the transducer; and wherein the third support member further has a first alignment leg portion spaced from both the first and second ends and projecting from the body portion of the third support member, the first alignment leg portion of the third support member having a bonding surface bonded to the second support member and aligned with an alignment leg portion of the second support member and also aligned with an alignment leg portion of the first support member; and wherein the third support member further has a second alignment leg portion projecting from the body portion of the third support member and having a bonding surface bonded to the second support member and aligned with an alignment leg portion of the second support member and also aligned with an alignment leg portion of the first support member.

6. The device of claim 5 wherein the first, second and third support members are positioned within the head in a tilted position defining a tilt direction relative to a longitudinal direction of media motion past the head, and in a staggered arrangement so that one end of the first support member is displaced relative to an adjacent end of the second support member in the tilt direction, one end of the second support member is displaced relative to an adjacent end of the third support member in the tilt direction, and one end of the third support member is displace relative to adjacent ends of the first and second support members in the tilt direction.

7. The device of claim 5 wherein the first, second and third support members each have a chiplet support surface having a boundary, and the first, second and third wafer chiplets each define a wafer chiplet footprint positioned wholly within the chiplet support surface boundary of the chiplet support surface of the associated support member so that the first wafer chiplet is fully supported over its entire footprint by the chiplet support surface of the first support member, and the third wafer chiplet is fully supported over its entire footprint by the chiplet support surface of the third support member.

8. A tape drive for data storage in data tracks on magnetic tape, comprising:

a tape head having a first support member having a body portion wherein the body portion has a first end, a second end distal from the first end, a first length extending longitudinally from the first end to the second end, and a first width transverse to the longitudinal length, and a first wafer chiplet disposed on the support member and having transducers formed in the chiplet, wherein the first support member further has a first alignment leg portion projecting from the body portion so that the support member has a width at the first alignment leg portion exceeding the first width of the body portion, the first alignment leg portion having a bonding surface spaced from both the first and second ends of the support member;

a tape actuator configured to move the magnetic tape in a linear direction past the tape head;

a pivotal actuator configured to cause pivotal motion of the tape head to skew the tape head relative to data tracks of the magnetic tape; and a controller configured to control the actuators and transducers to at least one of read data from and write data to data tracks of magnetic tape moving past the transducers.

9. The tape drive of claim 8 wherein the first support member further has a second alignment leg portion having a bonding surface and projecting from the body portion so that the support member has a width at the second alignment leg portion exceeding the first width of the body portion.

10. The tape drive of claim 9 wherein the body portion has a chamfered edge at one end of the body portion.

11. The tape drive of claim 8 wherein the head further has:

a second support member having a body portion wherein the body portion of the second support member has a first end, a second end distal from the first end, a first length extending longitudinally from the first end to the second end, and a first width transverse to the longitudinal length; and a second wafer chiplet disposed on the second support member and having transducers formed in the second wafer chiplet and adapted to at least one of read data from and write data to media moving past the transducer; and wherein the second support member further has a first alignment leg portion projecting from the body portion of the second support member and having a bonding surface aligned and bonded with the bonding surface of an alignment leg portion of the first support member, the second support member further having a second alignment leg portion projecting from the body portion of the second support member and having a bonding surface aligned and bonded with a bonding surface of another alignment leg portion of the first support member.

12. The tape drive of claim 11 wherein the head further has:

a third support member having a body portion wherein the body portion of the third support member has a first end, a second end distal from the first end, a first length extending longitudinally from the first end to the second end, and a first width transverse to the longitudinal length; and a third wafer chiplet disposed on the third support member and having transducers formed in the third wafer chiplet and adapted to at least one of read data from and write data to media moving past the transducer; and wherein the third support member further has a first alignment leg portion spaced from both the first and second ends and projecting from the body portion of the third support member, the first alignment leg portion of the third support member having a bonding surface bonded to the second support member and aligned with an alignment leg portion of the second support member and also aligned with an alignment leg portion of the first support member; and wherein the third support member further has a second alignment leg portion projecting from the body portion of the third support member and having a bonding surface bonded to the second support member and aligned with an alignment leg portion of the second support member and also aligned with an alignment leg portion of the first support member.

13. The tape drive of claim 12 wherein the first, second and third support members are positioned within the head in a tilted position defining a tilt direction relative to a longitudinal direction of media motion past the tape head, and in a staggered arrangement so that one end of the first support member is displaced relative to an adjacent end of the second support member in the tilt direction, one end of the second support member is displaced relative to an adjacent end of the third support member in the tilt direction, and one end of the third support member is displace relative to adjacent ends of the first and second support members in the tilt direction.

14. The tape drive of claim 12 wherein the first, second and third support members each have a chiplet support surface having a boundary, and the first, second and third wafer chiplets each define a wafer chiplet footprint positioned wholly within the chiplet support surface boundary of the chiplet support surface of the associated support member so that the first wafer chiplet is fully supported over its entire footprint by the chiplet support surface of the first support member, and the third wafer chiplet is fully supported over its entire footprint by the chiplet support surface of the third support member.

15. A method of fabricating a tape head for a tape drive for data storage on magnetic tape, comprising:

securing a first wafer chiplet having a first chiplet footprint onto a first chiplet support surface of a first body portion of a first support member having a first end, and a second end distal from the first end; and wherein the first chiplet support surface has a length longer than the first wafer chiplet footprint and a width wider than the first wafer chiplet footprint so that first wafer chiplet is fully supported over its entire footprint by the first chiplet support surface of the first support member; and wherein the first wafer chiplet has transducers formed in the chiplet and adapted to at least one of read data from and write data to media moving past the transducers.

16. The method of claim 15 wherein the first support member further has a first alignment leg portion projecting from the first body portion so that the first support member has a width at the first alignment leg portion exceeding the width of the first body portion, the first alignment leg portion having a bonding surface spaced from both the first and second ends of the support member, the method further comprising:

securing a second wafer chiplet having a second chiplet footprint onto a second chiplet support surface of a second body portion of a second support member wherein the second wafer chiplet has transducers formed in the second chiplet and adapted to at least one of read data from and write data to media moving past the transducers of the second chiplet; and aligning and bonding a bonding surface of a first alignment leg portion projecting from the second body portion of the second support member, with the bonding surface of the first alignment leg portion of the first support member.

17. The method of claim 16 further comprising:

aligning and bonding a bonding surface of a second alignment leg portion projecting from the second body portion of the second support member, with a bonding surface of a second alignment leg portion projecting from the first body portion of the first support member.

18. The method of claim 17 further comprising:

securing a third wafer chiplet having a third chiplet footprint onto a third chiplet support surface of a third body portion of a third support member having a first end, and a second end distal from the first end of the third support member; and wherein the third chiplet support surface of the third support member has a length longer than the third wafer chiplet footprint and a width wider than the third wafer chiplet footprint so that third wafer chiplet is fully supported over its entire footprint by the third chiplet support surface of the third support member; and wherein the third wafer chiplet has transducers formed in the chiplet and adapted to at least one of read data from and write data to media moving past the transducers of the third chiplet.

19. The method of claim 18 wherein the third support member further has a first alignment leg portion projecting from the third portion of the third support member so that the third support member has a width at the first alignment leg portion exceeding the width of the third body portion, the first alignment leg portion of the third support member having a bonding surface spaced from both the first and second ends of the third support member, the method further comprising:

aligning the first alignment leg portion projecting from the third body portion of the third support member, with the first alignment leg portions of the first and second support members, and bonding the bonding surface of the first alignment leg portion of the third support member with a bonding surface of the second support member.

20. The method of claim 19 further comprising aligning a second alignment leg portion projecting from the third body portion of the third support member, with the second alignment leg portions of the first and second support members, and bonding a bonding surface of the second alignment leg portion of the third support member with a bonding surface of the second support member; and positioning the first, second and third support members within the head in a tilted position defining a tilt direction relative to a longitudinal direction of media motion past the tape head, and in a staggered arrangement so that one end of the first support member is displaced relative to an adjacent end of the second support member in the tilt direction, one end of the second support member is displaced relative to an adjacent end of the third support member in the tilt direction, and one end of the third support member is displaced relative to adjacent ends of the first and second support members in the tilt direction.

* * * * *